United States Patent
Ashrafi

(10) Patent No.: US 9,949,133 B2
(45) Date of Patent: Apr. 17, 2018

(54) ULTRA-BROADBAND VIRTUALIZED TELECOM AND INTERNET

(71) Applicant: NxGen Partners IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

(21) Appl. No.: 15/664,764

(22) Filed: Jul. 31, 2017

(65) Prior Publication Data

US 2018/0041905 A1    Feb. 8, 2018

Related U.S. Application Data

(60) Provisional application No. 62/371,279, filed on Aug. 5, 2016.

(51) Int. Cl.
| | |
|---|---|
| H04L 12/28 | (2006.01) |
| H04W 16/10 | (2009.01) |
| H04L 12/24 | (2006.01) |
| H04L 29/08 | (2006.01) |
| H04J 1/16 | (2006.01) |
| H04B 1/00 | (2006.01) |
| H04B 7/0452 | (2017.01) |

(52) U.S. Cl.
CPC ......... H04W 16/10 (2013.01); H04L 41/0816 (2013.01); H04L 67/10 (2013.01); *H04B 1/0003* (2013.01); *H04B 7/0452* (2013.01)

(58) Field of Classification Search
USPC ................. 370/252, 329, 401, 386
See application file for complete search history.

(56) References Cited

U.S. PATENT DOCUMENTS

| | | | |
|---|---|---|---|
| 9,267,877 B2 | 2/2016 | Ashrafi et al. | |
| 9,331,875 B2 | 5/2016 | Ashrafi et al. | |
| 9,662,019 B2 | 5/2017 | Ashrafi et al. | |
| 2013/0165177 A1* | 6/2013 | Berg | H04W 24/04 455/524 |

(Continued)

OTHER PUBLICATIONS

S. Ashrafi, et al. "Performance Metrics and Design Considerations for a Free-Space Optical Orbital-Angular-Momentum-Multiplexed Communication Link, " Optics Letters vol. 40 (Optical Society of America, 2015).

(Continued)

*Primary Examiner* — John Pezzlo
(74) *Attorney, Agent, or Firm* — Munck Wilson Mandala, LLP

(57) ABSTRACT

A system provides a connection between a core network and at least one user device responsive to an application or service being used by the at least one user device. The system includes a dynamically configurable network including a plurality of control layers for connecting the core network and the at least one user device. At least one server implements the dynamically configurable network. The at least one server is configured to select a first slice portion of the plurality of control layers of the dynamically configurable network to support operation of a first application or service and to select a second slice portion of the plurality of control layers of the configurable network to support operation of a second application or service.

30 Claims, 17 Drawing Sheets

(56) References Cited

U.S. PATENT DOCUMENTS

2016/0041523 A1 2/2016 Ashrafi et al.
2016/0262068 A1* 9/2016 Won .................. H04W 36/0011
2017/0332359 A1* 11/2017 Tsai .................... H04W 72/042

OTHER PUBLICATIONS

S. Ashrafi, et al. "Optical communications using orbital angular momentum beams," Advances in Optics and Photonics vol. 7 (Optical Society of America, 2015).
S. Ashrafi, et al. "Enhanced Spectral Efficiency of 2.36 bits/s/Hz using Multiple Layer Overlay Modulation for QPSK over a 14-km Single Mode Fiber Link," OSA Technical Digest (Optical Society of America, 2015).
S. Ashrafi, et al. "400-Gbit/s Free Space Optical Communications Link Over 120-meter Using Multiplexing of 4 Collocated Orbital-Angular-Momentum Beams," OSA Technical Digest (Optical Society of America, 2015).
S. Ashrafi, et al, "Experimental Demonstration of Two-Mode 16-Gbit/s Free-Space mm-Wave Communications Link Using Thin Metamaterial Plates to Generate Orbital Angular Momentum Beams," (The Institute of Electrical and Electronics Engineers, 2015).
S. Ashrafi, et al. "Experimental Measurements of Multipath-Induced Intra- and Inter-Channel Crosstalk Effects in a Millimeter-Wave Communications Link using Orbital-Angular-Momentum Multiplexing," (The Institute of Electrical and Electronics Engineers, 2015).
S. Ashrafi, et al. "Demonstration of an Obstruction-Tolerant Millimeter-Wave Free-Space Communications Link of Two 1-Gbaud 16-QAM Channels using Bessel Beams Containing Orbital Angular Momentum," (Society of Photo-optical Instrumentation Engineers, 2015).
S. Ashrafi, et al. "Acoustically Induced Stresses in Elastic Cylinders and their Visualization," (Acoustical Society of America, 1987).
S. Ashrafi, et al. "Spurious Resonances and Modelling of Composite Resonators," (The Institute of Electrical and Electronics Engineers, 1983).
S. Ashrafi, et al. "Splitting and Contrary Motion of Coherent Bremsstrahlung Peaks in Strained-Layer Superlattices," (Optical Society of America, 1991).
S. Ashrafi, et al. "Channeling Radiation of Electrons in Crystal Lattices," Essays on Classical and Quantum Dynamics, Chap. 12 (1991).
S. Ashrafi, et al. "Splitting of Channeling-Radiation Peaks in Strained-Layer Superlattices," Journal vol. 8 (Optical Society of America, 1991).
S. Ashrafi, et al. "Evidence of Chaotic Pattern in Solar Flux Through a Reproducible Sequence of Period-Doubling-Type Bifurcations," Technical Report (National Aeronautics and Space Administration, 1991).
S. Ashrafi, et al. "Lyapunov Exponent of Solar Flux Time Series," (Proceedings of First Experimental Chaos Conference, 1991).
S. Ashrafi, et al. "Combining Schafien's Solar Activity Prediction Model with a Chaotic Prediction Model," Technical Report (National Aeronautics and Space Administration, 1991).
S. Ashrafi, et al, "Future Mission Studies: Forecasting Solar Flux Directly from its Chaotic Time Series," Technical Report (National Aeronautics and Space Administration, 1991).
S. Ashrafi, et al, "Future Mission Studies: Preliminary Comparisons of Solar Flux Models," Technical Report (National Aeronautics and Space Administration, 1991).
S. Ashrafi, et al, "Nonlinear Techniques for Forecasting Solar Activity Directly From its Time Series," Technical Report (National Aeronautics and Space Administration, 1992).
S. Ashrafi, et al, "Detecting and Disentangling Nonlinear Structure from Solar Flux Time Series," Conference Paper (National Aeronautics and Space Administration, 1993).
S. Ashrafi, et al, "Solar Flux Forecasting Using Mutual Information with an Optimal Delay," Conference Paper (National Aeronautics and Space Administration, 1993).
S. Ashrafi, et al, "PCS System Design Issues in the Presence of Microwave OFS," Electromagnetic Wave Interaction: Series on Stability, Vibration and Control of Systems: vol. 12 (1996).
S. Ashrafi, et al, "Performance Enhancement of an Orbital-Angular-Momentum-Based Free-Space Optical Communication Link Through Beam Divergence Controlling," OSA Technical Digest (Optical Society of America, 2015).
S. Ashrafi, et al, "Demonstration of Distance Emulation for an Orbital-Angular-Momentum Beam," OSA Technical Digest (Optical Society of America, 2015).
S. Ashrafi, et al, "Free-Space Optical Communications Using Orbital-Angular-Momentum Multiplexing Combined with MIMO-Based Spatial Multiplexing," OSA Technical Digest (Optical Society of America, 2015).
S. Ashrafi, et al, "Experimental Demonstration of a 400-Gbit/s Free Space Optical Link Using Multiple Orbital-Angular-Momentum Beams with Higher Order Radial Indices," OSA Technical Digest (Optical Society of America, 2015).

* cited by examiner

ULTRA-BROADBAND VIRTUALIZED TELECOM AND INTERNET

CROSS-REFERENCE TO RELATED APPLICATIONS

This application claims priority to U.S. Provisional Application No. 62/371,279, entitled ULTRA-BROADBAND VIRTUALIZED TELECOM AND INTERNET, filed Aug. 5, 2016, which is incorporated herein in its entirety.

TECHNICAL FIELD

The present invention relates to voice and data communications networks, and more particularly to a system and method of dynamically assigning network resources based upon an application or service provided by the voice and data communications network.

SUMMARY

The present invention, as disclosed and described herein, in one aspect thereof comprises a system that provides a connection between a core network and at least one user device responsive to an application or service being used by the at least one user device. The system includes a dynamically configurable network including a plurality of control layers for connecting the core network and the at least one user device. At least one server implements the dynamically configurable network. The at least one server is configured to select a first slice portion of the plurality of control layers of the dynamically configurable network to support operation of a first application or service and to select a second slice portion of the plurality of control layers of the configurable network to support operation of a second application or service.

BRIEF DESCRIPTION OF THE DRAWINGS

For a more complete understanding, reference is now made to the following description taken in conjunction with the accompanying Drawings in which.

DETAILED DESCRIPTION

Figure 1:
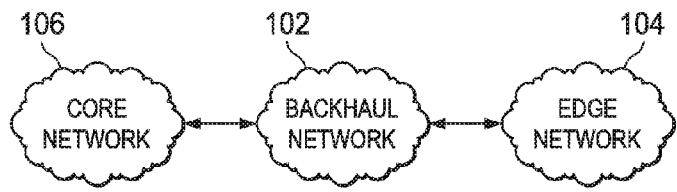
FIG. 1 illustrates the manner in which a backhaul network interconnects an edge network and a core network.

Referring now to the drawings, wherein like reference numbers are used herein to designate like elements throughout, the various views and embodiments of ultra-broadband virtualized telecom and internet are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated the manner in which a backhaul network 102 is used for interconnecting an edge network 104 with a core network 106. In a hierarchical network the backhaul network 102 comprises the intermediate links between the core network 106 (backbone network) and the small subnetworks at the edge of the entire hierarchical network. The backhaul network 102 carries packets/data to and from the core network 106. For example, in a telecommunications network cell phones communicating with a cell tower constitute a local subnetwork. The connection between the cell tower and the rest of the world begins with a backhaul links to the core of the Internet service provider network. Backhaul networks 102 may be used to describe the entire wired part of the network, although some networks have wireless instead of wired backhaul, in whole or in part, for example using microwave bands, mesh networks and edge network topologies. The backhaul network 102 may use high-capacity wireless channels to get packets to the microwave or fiber links.

Backhaul networks 102 may use a variety of technologies. The choice of backhaul technology must take into account parameters such as capacity, cost, reach and the need for such resources as frequency spectrum, optical fiber, wiring or rights-of-way. Generally, backhaul solutions can largely be categorized into wired (leased lines or copper/fiber) or wireless (point-to-point, point to multipoint over high-capacity radio links). Wired solutions are usually very expensive and often impossible to deploy in remote areas. This makes wireless a more suitable and/or viable option. Multi-hop wireless architecture can overcome the hurdles of wired solutions by creating efficient large coverage areas with growing demand in emerging markets where cost is often a major factor in deciding technologies. Wireless backhaul solutions are able to offer carrier grade services which are not easily feasible with wired backhaul connectivity. Backhaul technologies include free space optics, point-to-point microwave radio relay transmission (terrestrial or by satellite), point to multipoint microwave access technologies, such as LMDS, Wi-Fi, WiMAX, DSL variants such as ADSL and SHDSL, PDH and SDH Lasse Esso and ET interfaces, such as (fractional) E1/T1, E3, T3, STM-1/OC-3, etc. and ethernet. The system such as that more fully herein below may also be used within the systems such as that describe in U.S. patent application Ser. No. 14/882,085 entitled APPLICATION OF ORBITAL ANGULAR MOMENTUM TO FIBER, FSO AND RF filed on Oct. 15, 2015 which is incorporated herein by reference in its entirety to transmit information.

In addition to the plane wave embodiments that are disclosed in the described system for SDN-based channel estimation for multiplexing between LOS mmWaves, NLOS sub-6 GHz and FSO described herein, a system for implementing the twisted waves generated by the application of orthogonal functions to a plane wave may also be utilized. For example, the various embodiments disclosed in U.S. patent application Ser. No. 15/216,474 entitled SYSTEM AND METHOD FOR COMBINING MIMO AND MODE-DIVISION MULTIPLEXING filed on Jul. 21, 2016 and U.S. patent application Ser. No. 15/144,297 entitled SYSTEM AND METHOD FOR COMMUNICATION USING ORBITAL ANGULAR MOMENTUM WITH MULTIPLE LAYER OVERLAY MODULATION filed on May 2, 2016, each of which is incorporated herein by reference in their entirety may be used.

Hybrid (Heterogeneous) networks consist of networks including devices wherein in the components providing the transmission of data are all the same but may each be configured using the included operating software to provide different types of transmissions including but not limited to point-to-point (P2P); point-to-multipoint (P2MP); multi-point-to-multipoint (MP2MP); etc. The described system supports complex heterogeneous networks (HetNet) incorporating multiple services, standards and sites.

Architecture relates to the various system layers and their application to the system from the application layer to the hardware layer such as that described in U.S. Provisional Application No. 62/371,279, filed on Aug. 5, 2016 and entitled ULTRA-BROADBAND VIRTUALIZED TELECOM AND INTERNET.

Multiband as used herein relates to licensed and unlicensed bands as established in FCC regulations. Licensed bands include, but are not limited to, 24 GHz, 30 GHz, 28 GHz and sub-6 GHz. Unlicensed bands include, but are not limited to, U bands (60 GHz), E bands (71-76 GHz, 81-86 GHz) and WiFi.

Topology for systems implementing the described components may configure the nodes in a tree topology or a ring topology. The tree topology comprises a number of nodes interconnected in a tree structure beginning with a single node that expands to multiple second nodes and each of the second nodes expanding to further multiple third nodes or the single node interconnected to each of the other nodes of a network. Each of the other nodes communicates through the single central node. A ring topology includes a ring connection of all nodes with each node connected only to two adjacent nodes.

A multilayer backhaul network provides for communications using each of copper wire, fiber and RF transmissions. RF may use line of sight and non-line of sight transmissions. Copper may comprise vector bundled (VDSL2) and other types of transmissions. Fiber may use GPON or other types of transmissions.

When providing a variety of services over a fronthaul and/or backhaul network the backhaul network can become overburden causing it to become clogged with traffic and have greatly increased latency. Existing mobile and data networks can provide business-to-client (B2C) services such as commerce, music downloads, video streaming, gaming or social media access. The networks can also provide business-to-business (B2B) services such as IT services, finance, compliance, sales and marketing and customer services. These services are provided over fronthaul and backhaul networks using wired and wireless connections. If a large volume of voice or data services are being used at any particular time, the backhaul network can be overburdened and provide unacceptable services to the customers due to increased latency and delay.

Operators of the backhaul network face a number of challenges. These include declining margins due to the increased demand for video and cloud services creating an explosion of carried traffic. Average revenue per user does not increase linearly with carried traffic thus resulting in declining margins. Additionally, reductions in core equipment cost do not follow Moore's law. Network heterogeneity requires multiple specialized solutions/teams. Automation for configuration and provisioning of network resources increase the network costs. Additional network problems for network providers arise from the low return on investment due to the fact that networks are built for peak usage times and are over provisioned most of the time. Additionally, the current mode of operation for network providers results in slow service innovations due to the lack of network automation and service integration that results in long provisioning delays. The infrastructure is built using closed proprietary boxes. This results in inefficient utilization of radio resources, the inability to provide customization, a slowing in the creation of innovative services and the inability to support industry specific Internet of things scenarios. Thus, there is a need for an architecture for providing a backhaul network that provides more flexibility and enables better use of new protocols such as 5G.

Figure 2:
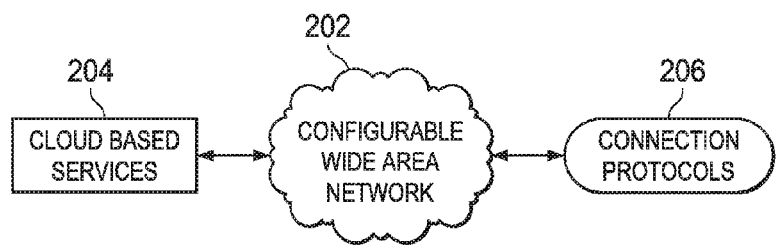
FIG. 2 illustrates a backhaul network set up as a configurable wide area network.

In order to provide a more flexible network, a backhaul network may be set up as a configurable wide area network 202 as illustrated in FIG. 2. The configurable wide area network 202 provides a bridge between cloud-based services 204 and various connection protocols 206. The configurable wide area network 202 provides a number of benefits including economies of scale that provides an infrastructure built with a few commodity building blocks using Open-Source SDN/NFV software and white boxes and providing agility through software platforms that enable the rapid creation of new services. This provides a UltraBroadband on demand network on both RF and fiber that uses virtual radio access network (VRAN), mobile edge computing (MEC), caching of content at the edge of the network and APIs. The system would also use CORD since it is cloud native. The system will provide SDR based massive MIMO that is used in combination with SDN based network slicing and SDN based fronthaul and backhaul networks on the network architecture.

Figure 3:
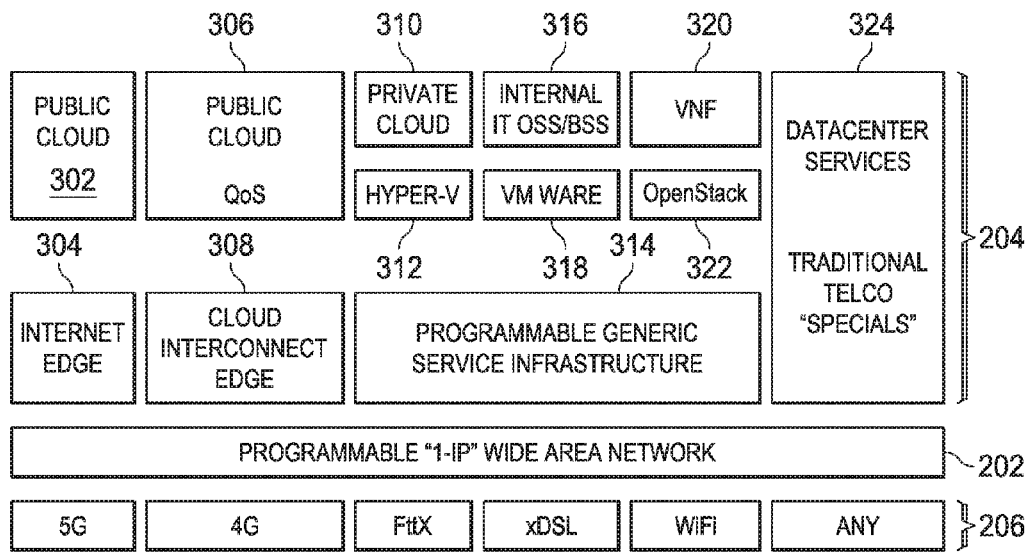
FIG. 3 illustrates a configurable wide area network interconnecting various resources through the cloud.

This is more particularly illustrated in FIG. 3. The configurable/programmable wide area network 202 varies its utilized resources based upon the particular applications or services that are being utilized. The various cloud-based services 204 include the public cloud 302 which interconnects to the wide area network 202 through an Internet Edge 304. Internet Edge 304 is a data network to cell phones. A public cloud 306 requiring a particular quality of service may utilize the cloud interconnect edge 308. The cloud interconnect edge 308 is an optimized network that ensures accelerated access to applications hosted in public, private and hybrid clouds.

A private cloud 310 may connect to the wide area network 202 through Hyper-V 312 and a programmable generic service infrastructure 314. Hyper-V 312 is a native hypervisor that creates virtual machines on systems running Windows. It acts as a hardware virtualization component for the client editions of Windows NT server computer running Hyper-V 312 can be configured to expose individual virtual machines to one or more networks. The programmable generic service infrastructure 314 comprises a generic hardware component program to provide a particular service infrastructure. An Internet IT OSS/BSS 316 communicates through VM hardware 318 and the programmable generic service infrastructure 314 with the programmable wide area network 202. The VMware 318 comprises virtualization and cloud computing software. Virtual network functions (VNF) 320 interact with the network 202 through OpenStack 322 and the programmable generic service infrastructure 314. OpenStack 322 is a set of software tools for building and managing a cloud computing platform for public and private clouds. Finally, data center services 324 may provide data services through the wide area network 202 using traditional Telco "specials."

Figure 4:
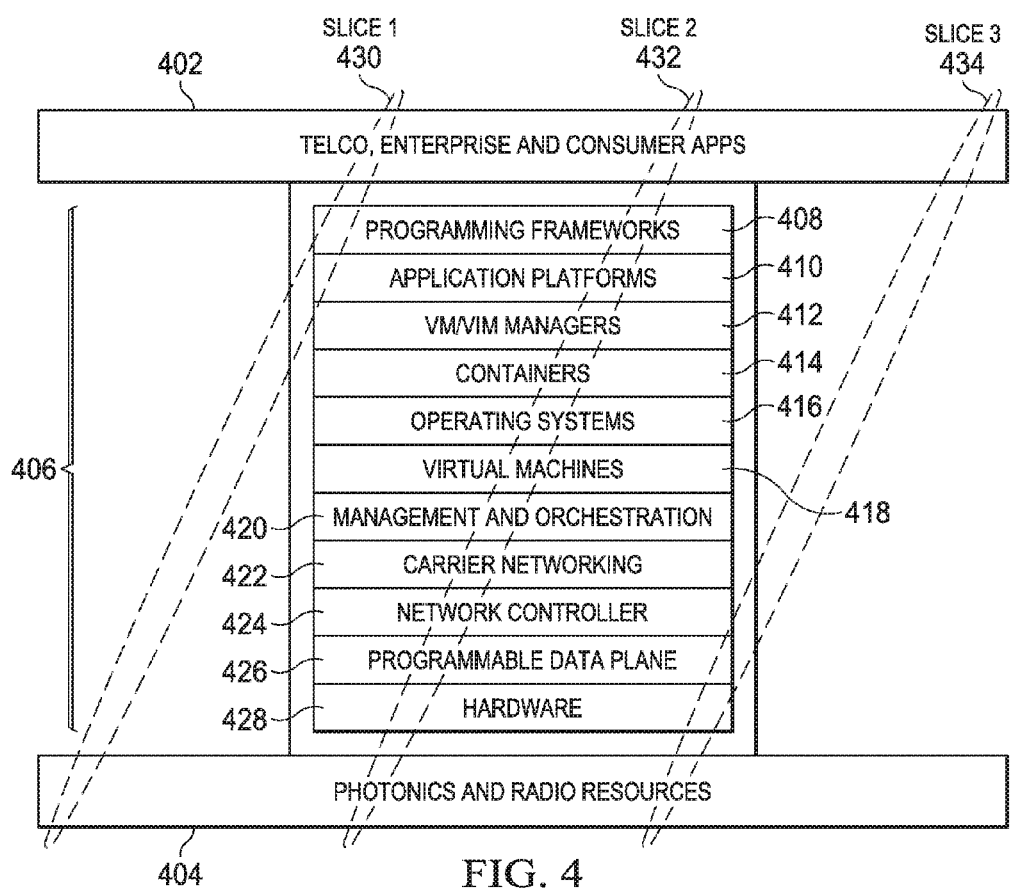
FIG. 4 illustrates one manner for implementation of the configurable network.

Referring now to FIG. 4, there is illustrated one manner in which the configurable wide area network 202 may be implemented in order to provide flexible network resources based upon an application's or service's particular needs. Various telco, enterprise and consumer applications 402 utilize various photonic and radio resources 404 through a number of control layers 406. The control layers 406 include the programming frameworks layer 408; application platforms layer 410; VM/VIM managers layer 412; containers layer 414; operating systems layer 416; virtual machines layer 418; management and orchestration layer 420; carrier network layer 422; network controller layer 724; programmable data plane layer 726 and hardware layer 428. Various portions of each of the layers 406 are needed to provide interconnection between the telco, enterprise and consumer applications 402 and the photonic and radio resources 404.

As described previously, current network topologies configure the layers to support peak periods. This requires the network to be over configured for all but a small percentage of its operating time. Each of the control layers 406 provide differing amounts of control depending upon the applications 402 and network resources 404 that are being utilized by the system. Thus, various slices of the control layers 406 are utilized when providing particular applications 402 using particular resources 404. Thus, slice 430, slice 432 and slice 434 each utilize various, differing and adaptable portions of the control layers 406 in order to operate a particular application using particular resources. These slices 430-434 can be dynamically adjusted within the system applications and resources depending upon changing system needs. Thus, a slice 430, 432, 434 can be uniquely and adaptively configured to utilize only those network control layers 406 and only those portions of the network control layers that are necessary in order to have the application function in a desired fashion. Thus, the availability of the network control layers 406 can vary depending upon the particular slices 430, 432, 434 that are being currently utilized by the network.

Figure 5:
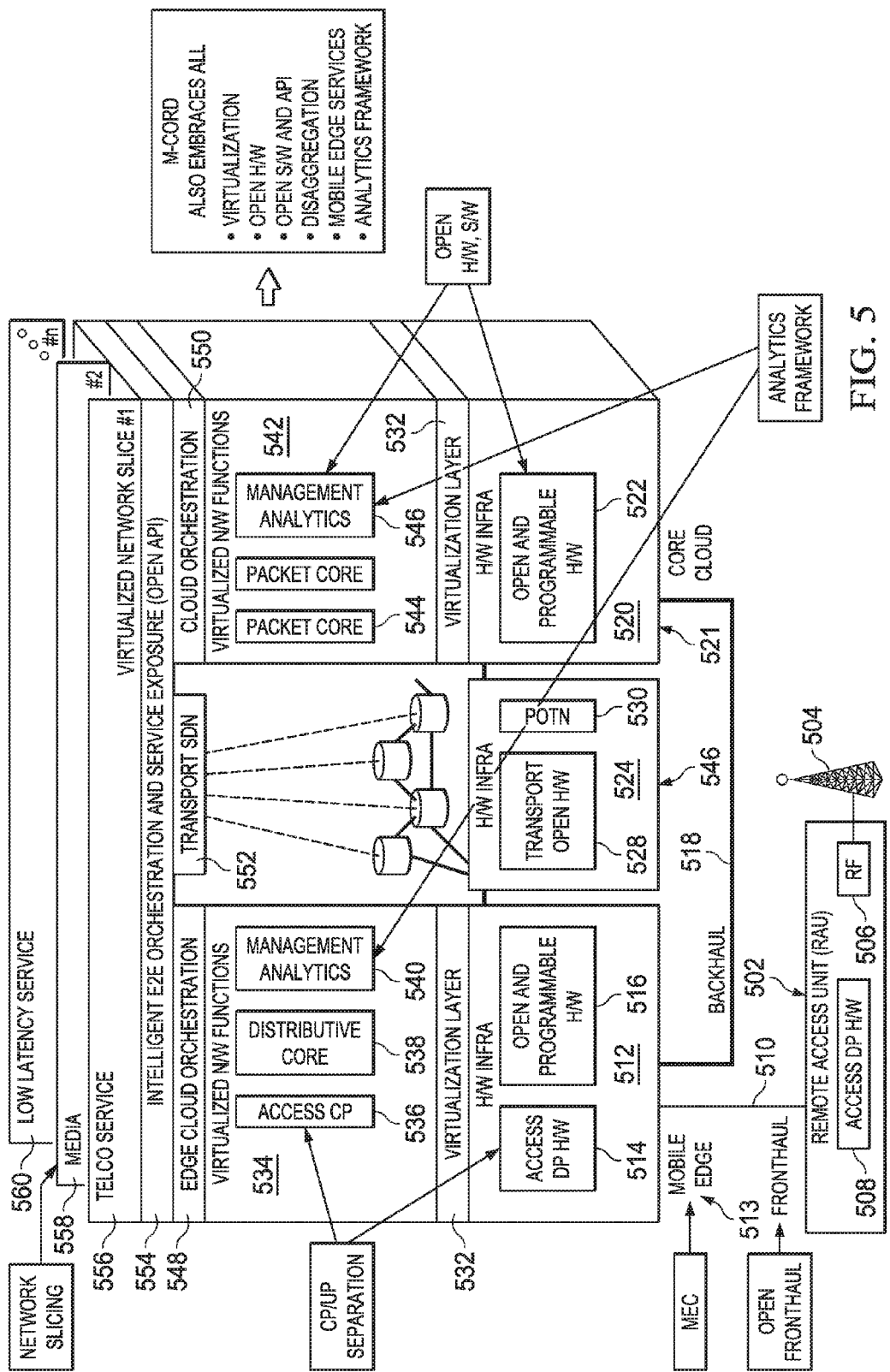
FIG. 5 illustrates a functional block diagram of a system implementing a configurable wide area network.

Referring now to FIG. 5, there is illustrated a functional block diagram of a system implementing the configurable wide area network operating in the manner described hereinabove. A remote access unit (RAU) 502 communicates with a radio antenna 504. The radio access unit 502 includes RF circuitry 506 for communicating with the radio tower and access DP hardware 508 for communicating over the fronthaul 510. A hardware infrastructure 512 associated with the mobile edge 513 includes access DP hardware 514 for communicating with the radio access unit 502. The hardware infrastructure 512 further includes open and programmable hardware 516 for providing a backhaul communications link 518 with additional hardware infrastructure 520 associated with the network core 521. The hardware infrastructure 520 associated with the network core 521 includes open and programmable hardware 522 enabling communications over the backhaul 518. Additional hardware infrastructure 524 is utilize for a transport layer 526. The hardware infrastructure 524 includes transport open hardware 528 and a POTN (packet optical transport network) 530.

Each of the mobile edge network 513 and core cloud network 521 include a virtualization layer 532 on top of the hardware infrastructures 512, 520, respectively. On top of the virtualization layer 532 associated with the mobile edge network 513, a number of virtualized network functions 534 reside. These virtualized network functions 534 include access CP functions 536, distributive core functions 538 and management analytics 540. Another group of virtualized network functions 542 exist upon the virtualization layer 532 within the core cloud network 521. These functions include packet core functions 544 and management analytics 546.

On top of the virtualized network functions 534, edge cloud orchestration functionalities 548 are implemented within the core cloud network 521. Cloud orchestration functionalities 550 are implemented on top of the virtualized network functions 542. Additionally, within the transport layer 526, a transport software defined network 552 enables control of transport between the mobile edge 513 and core cloud 521. The use of software defined networks will be more fully discussed herein below.

On top of each of the orchestration and SDN layers is an intelligent E2E orchestration and service exposure (open API) 554. Through this open API 554, the virtualized network slices 556-560 may be utilized to implement only those network functionalities that are necessary to carry out particular applications using specific hardware resources. Examples of these type of network slices include Telco (telecommunication) services 556; media services 558, such as various types of video streaming; and various types of low latency services 560 that do not require a high latency level in order to perform their functionalities. Each of the slices 556-560 would only utilize as much of the network services within the mobile edge 513, core cloud 521 and transport layer 526 in order to achieve the operations virtualized by each network slice.

Figure 6:
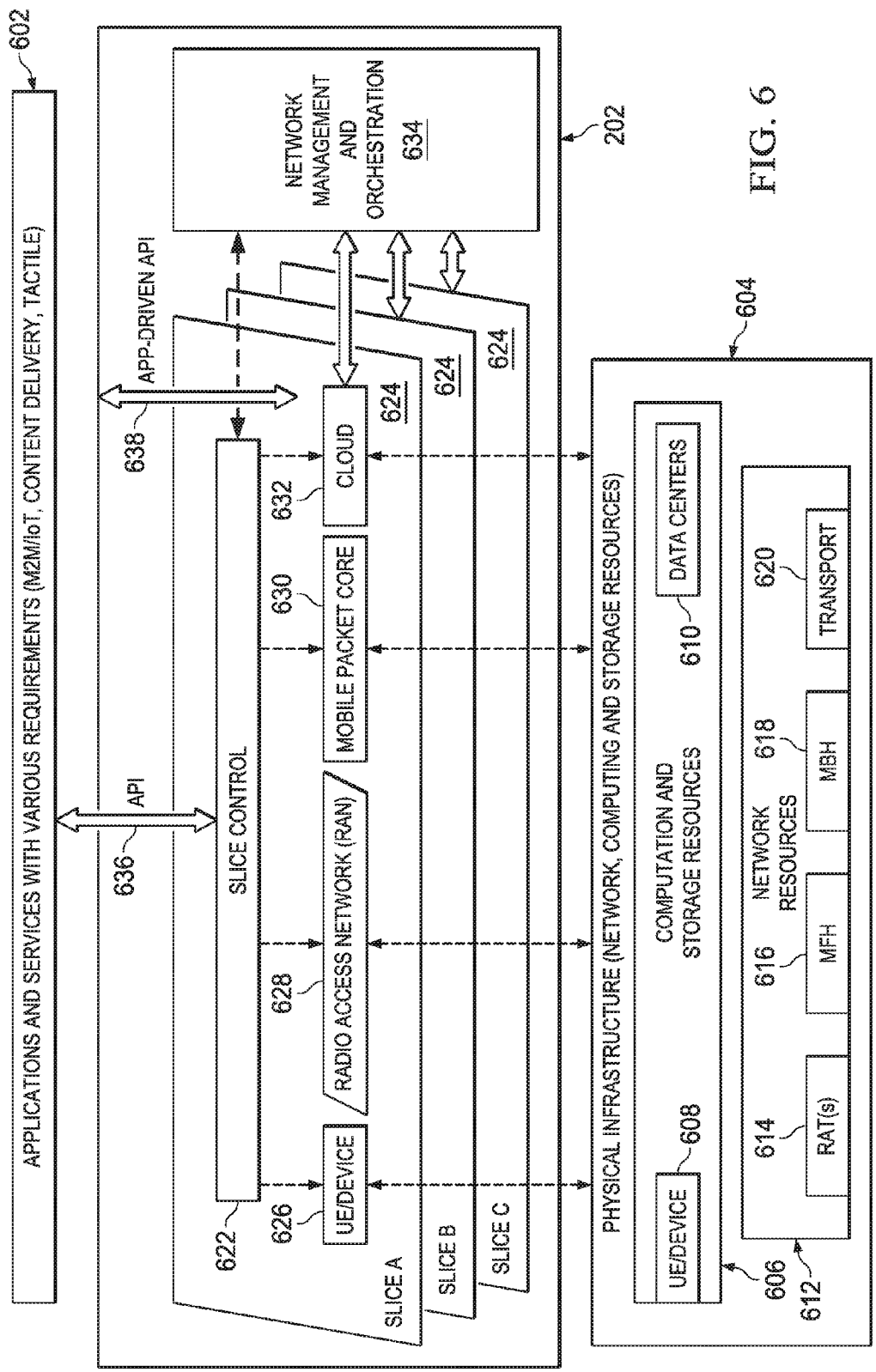
FIG. 6 illustrates a manner in which a configurable wide area network controls interactions between applications and infrastructure.

Referring now to FIG. 6, there is illustrated the manner in which the configurable wide area network 202 controls interactions between applications and services 602 and the physical infrastructure 604. The applications and services 602 are located within an application layer and have various requirements that differ depending upon the bandwidth needs of the application or service. The physical infrastructure 604 is included within the physical layer hardware and comprises computation and storage resources 606 including items such as user equipment and devices 608 and data centers 610 storing information and accessible resources. The user equipment and devices 608 represent handsets, mobile terminals, sensors, actuators, etc. The physical infrastructure 604 further includes network resources 612 such as radio access towers 614, the mobile fronthaul 616, the mobile backhaul 618 and the transport network 620.

The configurable wide area network 202 comprises the network layer where network functions are implemented in software and includes slice control 622 for selecting the network resources that are required in order to implement a particular application or service that is currently being utilized. The slice control 622 utilizes a number of factors and domain specific orchestration controls in order to establish a particular slice 624. These include user equipment/device control 626, radio access network control 628, mobile packet core control 630 and cloud control 632. The domain specific orchestration controls may exist individually and for each network provider. The slice control 622 communicates with the various applications and services through an application program interface 636. The network resource controllers 626-632 communicate with the applications and services through an app driven API. Network management and orchestration 634 works with the slice control 622 and the various network resource controls 626-632 in order to establish the various slices 624. Network management and orchestration 634 consolidates management of inter-slice, slice lifecycle and resource management over multiple network domains in end-to-end connections. Within individual slices 624, virtual network functionalities (VNFs) and virtual transport paths are mapped on the sliced network topologies. The slices 624 encompass capabilities of transport control and network functionalities.

Figure 7:
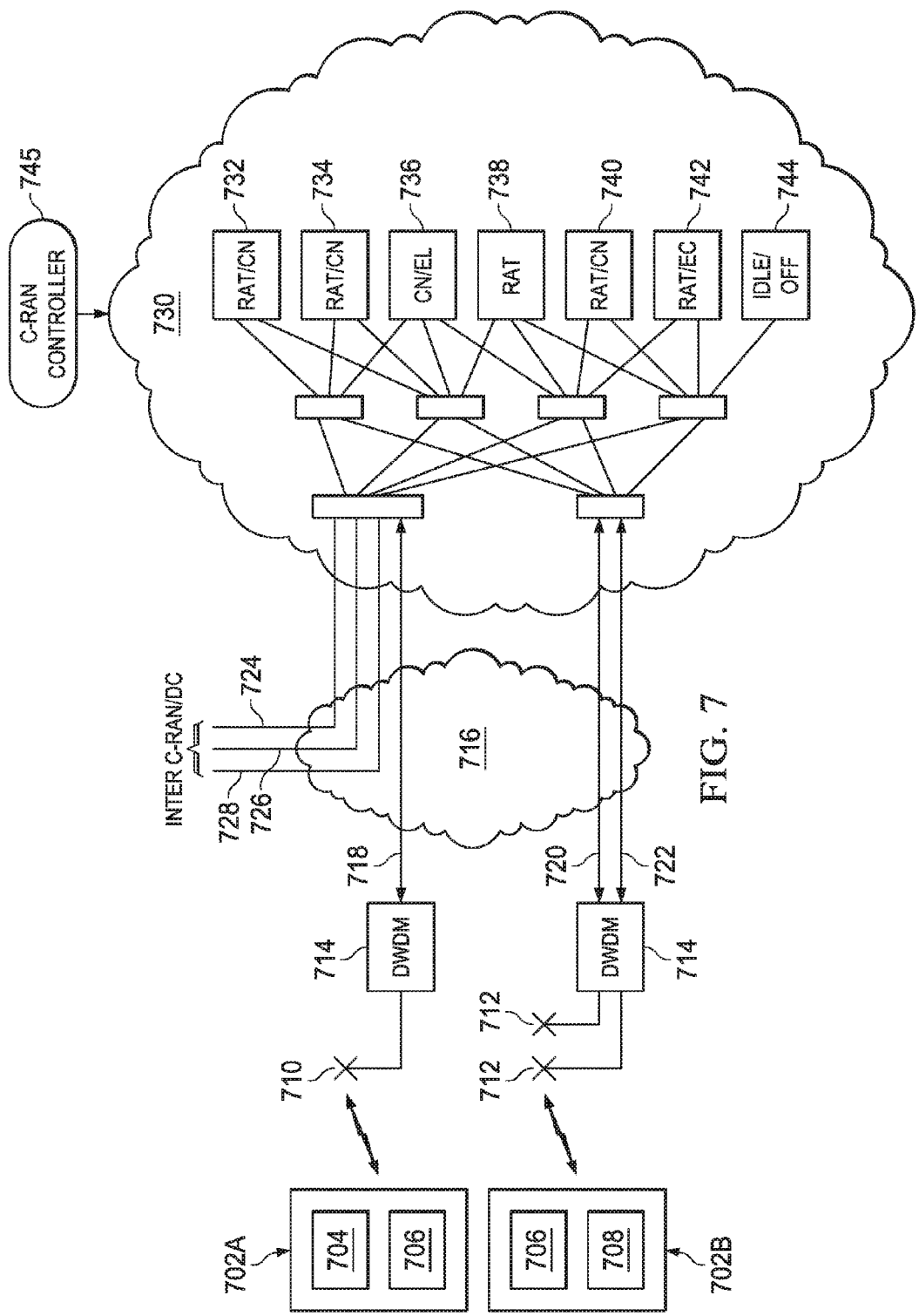
FIG. 7 illustrates a virtualization and slicing process under software control within a cloud radio access network.

Referring now to FIG. 7, there is illustrated a virtualization and slicing process under software control within a cloud radio access network (C-RAN). First and second user devices 702 each implement first and second applications 704, 706 in the case of device 702A and second and third applications 706, 708 in the case of device 702B. The user devices 702 are in wireless communication with antennas 710 and 712. Antenna 710 is associated with the digital radio network while antennas 712 are associated with an analog, digital or packet radio network. Each of the antennas 710, 712 are connected to a dense wavelength division multiplexer 714. The multiplexer 714 implements an optical multiplexing technology that combines and transmits multiple signals simultaneously on different links over the same fiber. The multiplexer 714 establishes a connection through a TSDN hybrid slice fronthaul IDC backhaul 716 link 718 is associated with application 706. Link 720 is associated with application 704, and link 722 is associated with application 708.

A number of GE 400 links 724-728 are provided from an Inter C-RAN/DC network to a CORE/vEPC network through the TSDN hybrid slice fronthaul IDC backhaul 716 to the C-RANs 730. Link 724 is associated with application 706. Link 726 is associated with application 704, and link 728 is associated with application 708.

The cloud radio access network 730 consist of a number of resources including radio access terminals (RATs), CORE network (CN), mobile edge computing (MEC) and other types of server/core functions. In the example of FIG. 7, a number of RAT/CN servers 732, 734 and 740 are used along with CN/EC (edge computing) server 736, RAT server 738, RAT/EC server 742 and an idol/off server 744. The cloud radio access network 730 is controlled through a C-RAN controller 745.

Any resource may be part of any slice. In the example of FIG. 7, a first slice is associated with application 704 and consists of links 720, 726 and resources 738 and 740. The first slice provides ultra-reliable, low bandwidth, long rang and high mobility connection. A second slice is associated with application 706 and consist of links 718, 724 and resources 732, 734 and 736. The second slice provides the highest bandwidth for short range connections. A final slice is associated with application 708 and consist of links 722, 728 and resources 740 and 742. The final slice provides the lowest delay to be used for low signaling connections. Idle resources such as resource 744 may be moved from one slice to another depending upon the needs of the particular slice. Additionally, presently assigned links and resources may be dynamically adjusted depending upon the needs of a particular slice. Resources include virtual machine servers, intra/inter C-RAN B/W, C-RAN to radio configurations of base station and UE devices.

Figure 8:
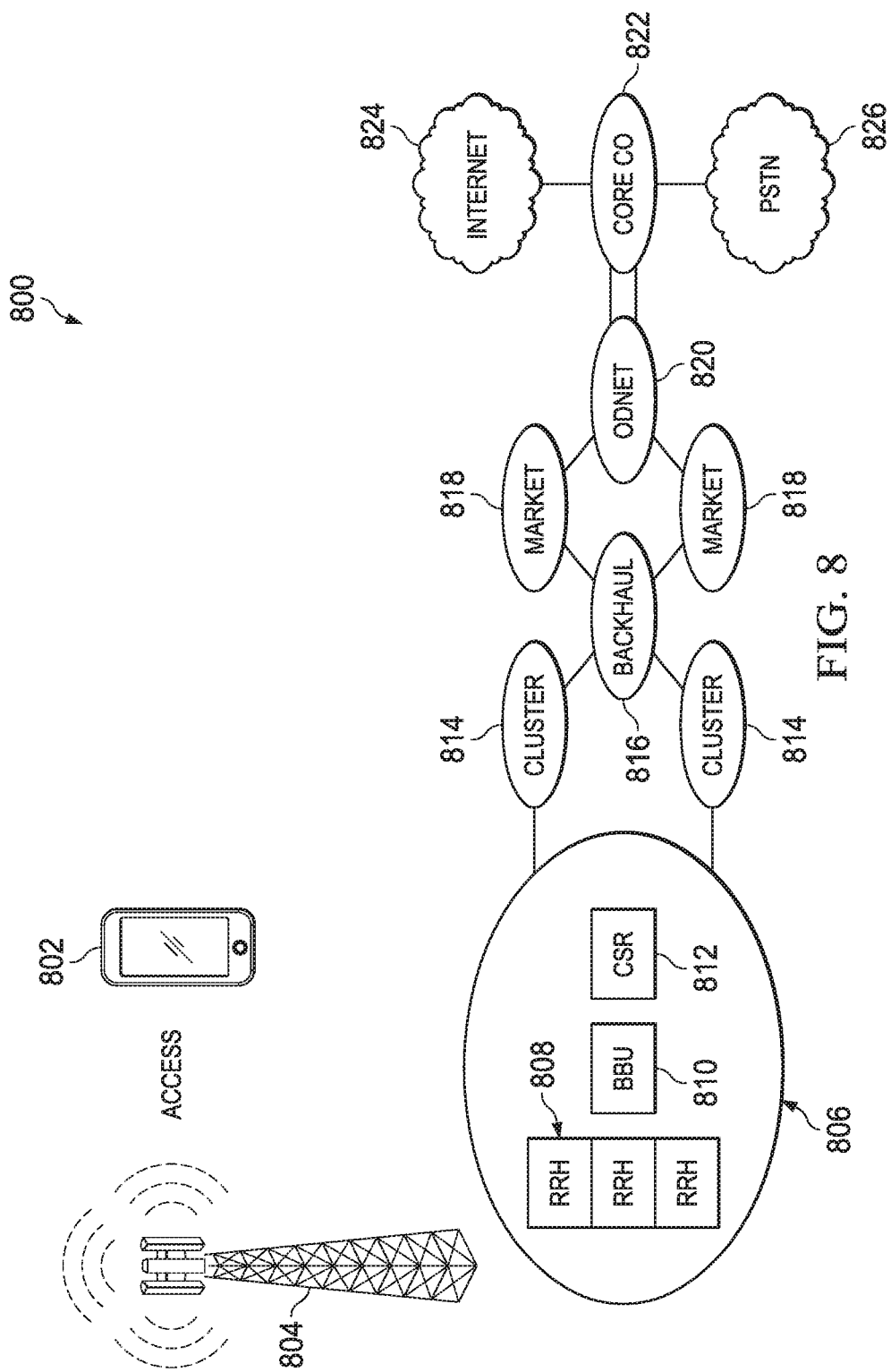
FIG. 8 illustrates a traditional network configuration.

Referring now to FIG. 8, there is illustrated a traditional network configuration. A user device 802 establishes a wire connection with an antenna 804 of the radio access network. Antenna 804 communicates with the base station 806. The base station 806 includes a number of remote radio heads (RRHs) 808. The RRHs 808 contains the base stations RF circuitry plus analog-to-digital/digital-to-analog converters and up/down converters. RRHs 808 have operation and management processing capabilities and a standardize optical interface to connect to the remainder of the base station 806. The baseband unit (BBU) 810 processes baseband within the radio link for signals to/from the RRH 808. The channel state report (CSR) 812 generates channel state information for the communications link. The base station 806 is associated with other base stations within a cluster 814. The cluster 814 comprises a cluster of cells.

The base station 806 communications are transmitted from the various clusters 814 over a backhaul network 816. The backhaul network 816 connects to various markets 818 (particular areas having cell networks) to the optical data network (ODNET) 820. The optical data network 820 connects to the core central office 822. The core central office 822 communicates with the Internet 824 or public switched telephone network (PSTN) 826 in order to download data information or provide voice communications.

Figure 9:
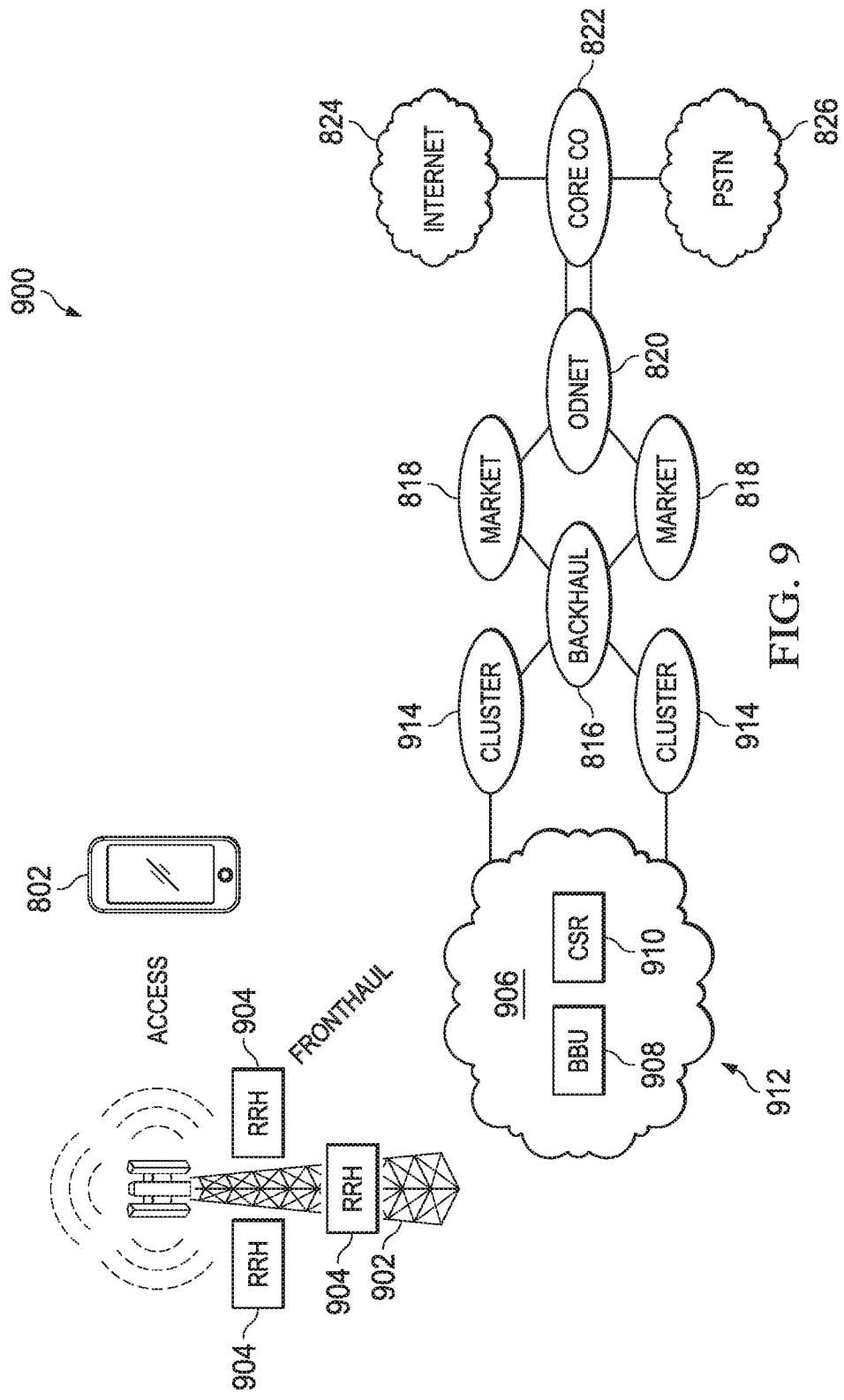
FIG. 9 illustrates a virtual radio access network.

Referring now to FIG. 9, a virtual radio access network 900 is illustrated. Within the virtual radio access network 900, the configuration from the backhaul network 816 to the core central office 822, and the core central offices connections to the Internet 824 and the PSTN 826 are the same as that described with respect to the traditional network 800 of FIG. 8. The user device 802 communicates with and antenna 902 over wireless communication links. The remote radio heads 904 are located at the antenna 902 rather than a base station. The remote radio heads are in communication with a virtual base station 906 virtualized within the cloud that implements a baseband unit 908 and channel state report 910 within the network cloud 912. Virtualized functions are implemented using NFV as will be more fully discussed herein below. Virtualized functions may also use SDN wherein the control functions are taken out of the hardware and implemented within software as will be more fully described. The BBUs communicate with the RRHs over a fronthaul which may be fiber or wireless. The virtual base stations 906 are associated with other clusters 914 that communicate through the backhaul network 816 as described previously.

As systems evolve towards RAN2020, CloudRAN architecture is used to implement RAN real time functions, on-demand deployment of non-real-time resources, component-based functions, flexible coordination, and RAN slicing. With Mobile Cloud Engine (MCE), CloudRAN can support orchestration for RAN real time and non-real-time functions based on different service requirements and transmission resource to perform cloudification (and virtualization) of the RAN.

The RAN real time functions include access network scheduling, link adaptation, power control, interference coordination, retransmission, modulation, and coding. These functions require high real-time performance and computing load. The deployment of sites must include dedicated hardware with high accelerator processing and be located in close to services. The RAN non-real-time functions include inter-cell handover, cell selection and reselection, user-plane encryption, and multiple connection convergence. These functions need low real-time performance and latency requirements and fit for centralized deployment. MCE can support management and coordinating multiple processing capabilities based on regional time, frequency bands, and space. This architecture allows CloudRAN to support 4G, 4.5G, 5G (different bands), and Wi-Fi, and coordination of macro, micro, pico and massive MIMO sites. Network functions are deployed on radio, backbone, or core nodes to maximize network efficiency.

Multi-connectivity is fundamental to the future network architecture. Multi-connectivity with carrier aggregation can support the usage of licensed, shared and unlicensed bands to provide bandwidth hungry applications used by power users that leverage small cells or massive MIMO. CloudRAN can be deployed in a unified network architecture. In current fragmented networks, increasing speed and reducing latency can improve user experience. Reliable high-speed data cannot depend on a single frequency band or standard connections. In heterogeneous networks, multi-connectivity helps provide an optimal user experience based on LTE and 5G capabilities, such as high bandwidth and rates of high frequency, network coverage and reliable mobility of low frequency, and accessible Wi-Fi. This could mean a combined coordination of licensed, shared and unlicensed bands to support power users that use high-bandwidth applications. In scenarios that require high bandwidth or continuity, a user requires multiple concurrent connections. For example, data aggregation from multiple subscriptions to 5G, LTE, and Wi-Fi (licensed, shared and unlicensed bands) to aggregate and produce high bandwidth. An LTE network access has to maintain continuity after a user has accessed a 5G high-frequency small cell.

In scenarios that have multiple technologies, CloudRAN can be an anchor for data connection which reduces alternative transmission. In the traditional architecture integrating base stations as an anchor for data connection, LTE, 5G, and Wi-Fi data is aggregated into a non-real time processing module of a specific standard to be forwarded to each access point. In this CloudRAN architecture, non-real time processing functions in access points of different modes are integrated into the MCE, which is as an anchor for data connection. Data flows are transmitted to each access point over the MCE, which prevents alternative transmission and reduces transmission investment.

Figure 10:
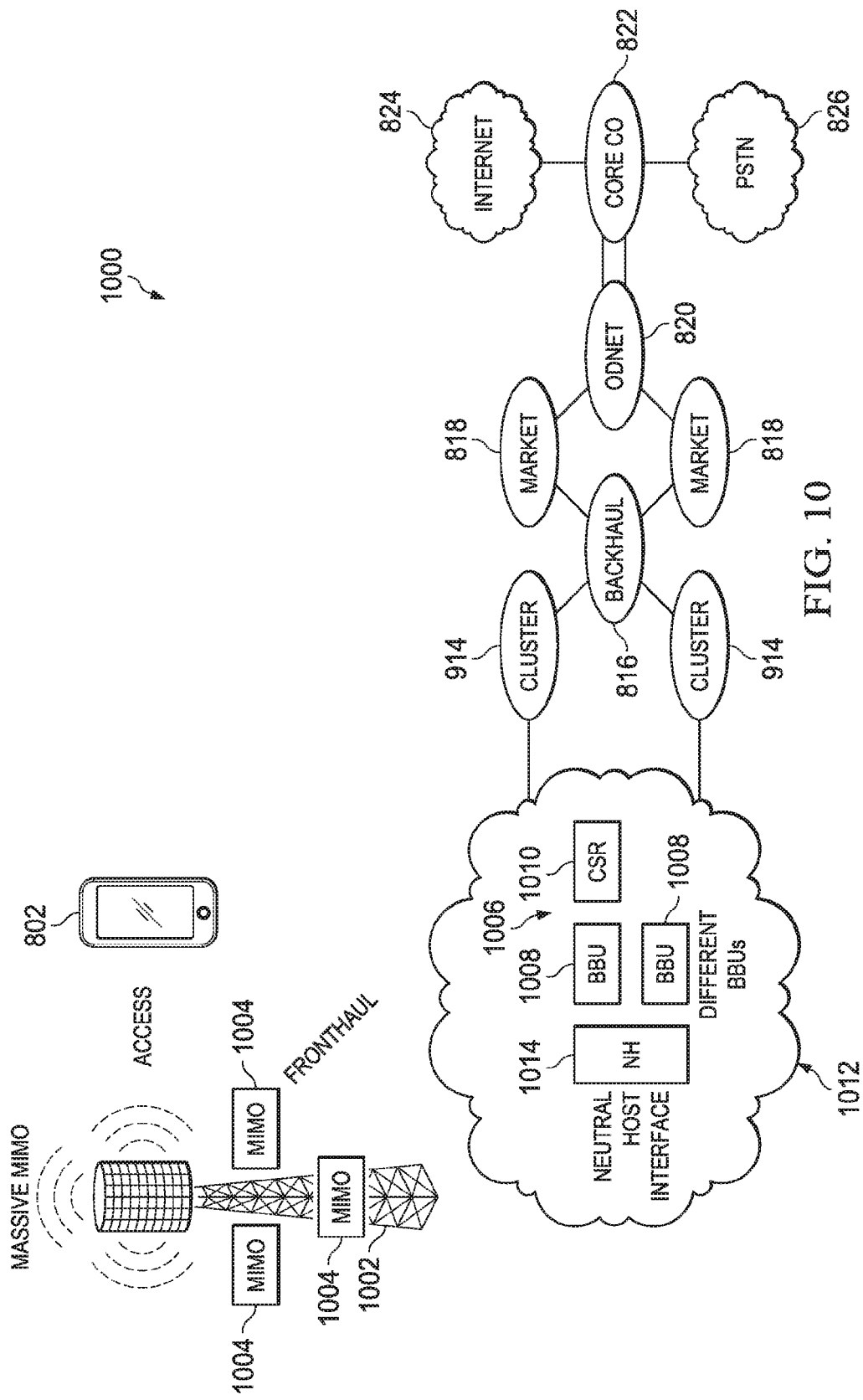
FIG. 10 illustrates a massive MIMO neutral host network.

Referring now to FIG. 10, a virtual radio access network 1000 is illustrated. Within the virtual radio access network 1000, the configuration from the backhaul network 816 to the core central office 822 and the core central offices connections to the Internet 824 and the PSTN 826 are the same as that described with respect to the traditional network 800 of FIG. 8. The user device 802 communicates with and antenna 1002 over wireless communication links. The antenna 1002 includes a number of massive MIMO antenna configurations 1004 providing multiple input multiple output transceiver capabilities such as those disclosed in U.S. patent application Ser. No. 15/216,474, entitled SYSTEM AND METHOD FOR COMBINING MIMO AND MODE-DIVISION MULTIPLEXING, filed on Jul. 21, 2016, which is incorporated herein by reference in its entirety. The MIMO transceivers 1004 are located at the antenna 1002 rather than a base station. The MIMO transceivers 1004 are in communication with a virtual base station 1006 that implements a plurality of baseband unit 1008 that are each associated with different MIMO transceivers 1004, different network providers and channel state report 1010 within the network cloud 1012. A neural host interface 1014 controls the interactions between the MIMO transceivers 1004 and the base band units 1008. The virtual base stations 1006 are associated with other clusters 914 that communicate through the backhaul network 816 as described previously.

Figure 11:
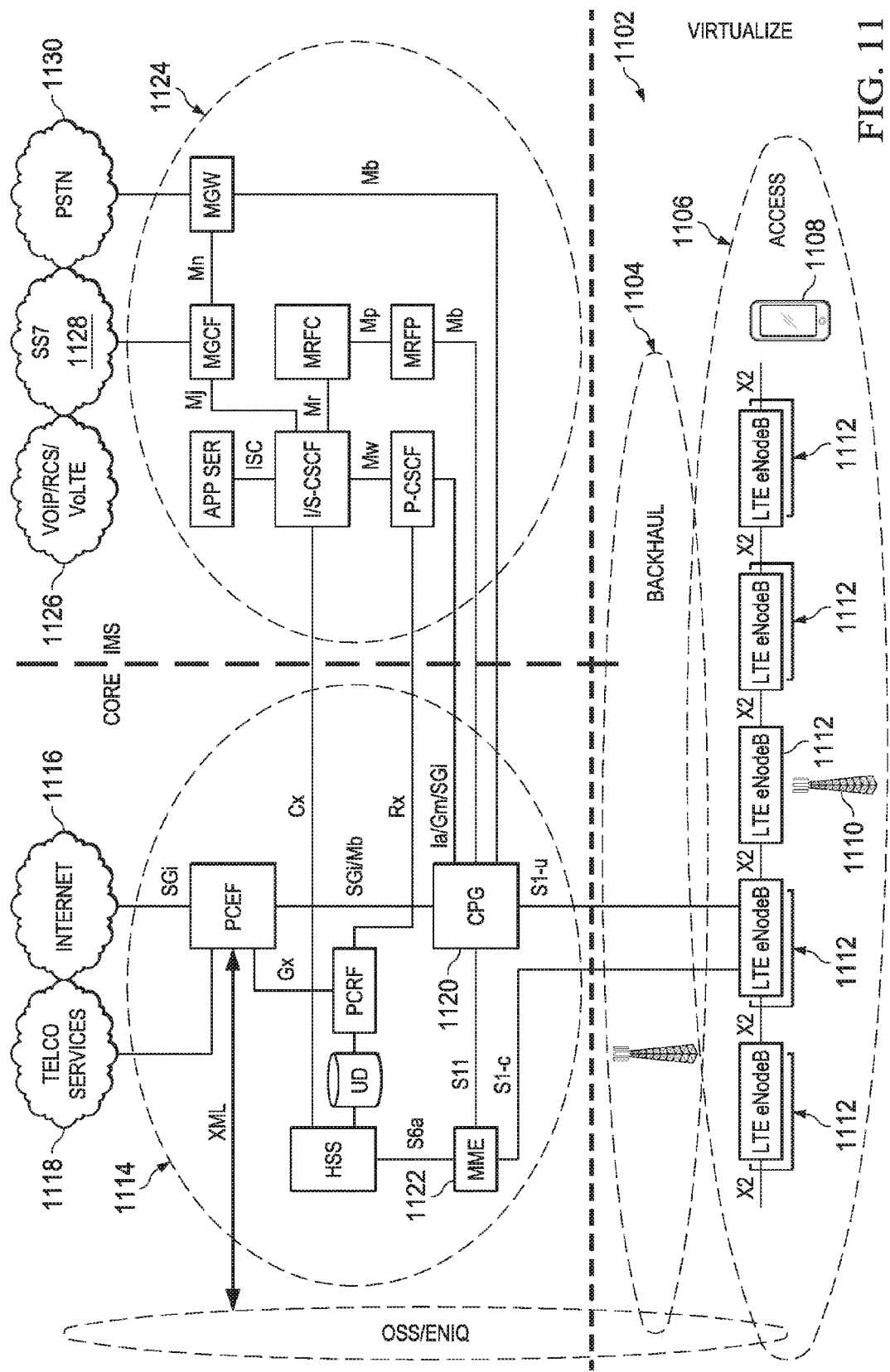
FIG. 11 illustrates a virtualized base station and backhaul network.

Referring now to FIG. 11, there is more particularly illustrated the virtualized base station 1006 and backhaul 816 portions of the networks. The virtualized portion 1102 consists of the backhaul network 1104 and the access network 1106. The access network 1106 enables a user device 1108 to communicate with an antenna 1110 via an RF link. The antennas 1110 communicate with various LTE eNodeBs 1112. The various LTE eNodeBs 1112 and backhaul network 1104 are implemented in software using, for example, software defined networking (SDN) and network function virtualization (NFV) as will be more fully described herein below. The virtualized backhaul network 1104 communicates with the core network 1114 through a converged packet gateway (CPG) 1120 and a mobility management entity (MME) 1122 to provide access to the Internet 1116 and telco services 1118. The core network 1114 provides access to the Internet multimedia subset (IMS) 1124 to provide access to VOIP/RCS/VoLTE 1126, SS7 network 1128 and the public switched telephone network (PSTN) 1130.

Figure 12A:
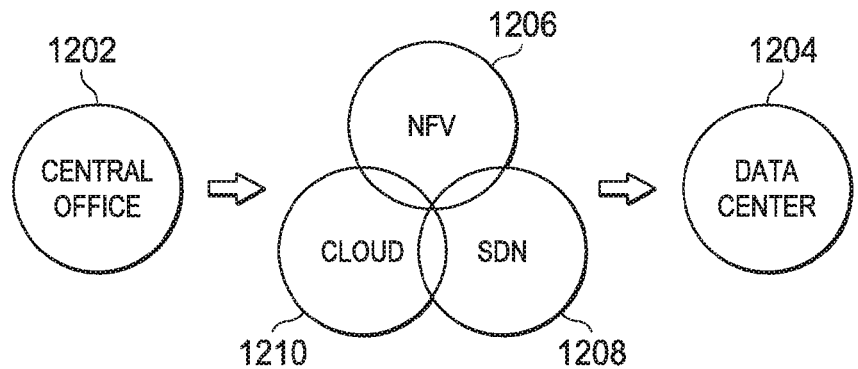
FIG. 12A illustrates the manner in which a central office may be converted to a data center.

Referring now to FIG. 12A, there is illustrated the manner in which a central office 1202 may be converted to a data center 1204 (CORD). The conversion from central office functionalities 1202 to data center functionalities 1204 are carried out using a combination of network function virtualization (NFV) 1206, software defined networks (SDN) 1208 and the cloud 1210. The operation of NFV 1206 and SDN 1208 will be discussed more fully herein below. This reconfiguration of the central office 1202 to a data center 1204 provides for rapid innovation, re-personalizable hardware, agile dev-op models, low cost operating expenses, application network awareness, service programmability, customer control and quick deployment options.

The cloud adaptation of networks, operation systems, and services is the core for an "all cloud" approach to the network (hardware resources, distributed software architecture, and automatic deployment). Operators transform networks using a network architecture based on data center (DC) 1204 in which all functions and applications are running on the cloud data center (cloud-native architecture).

Figure 12B:
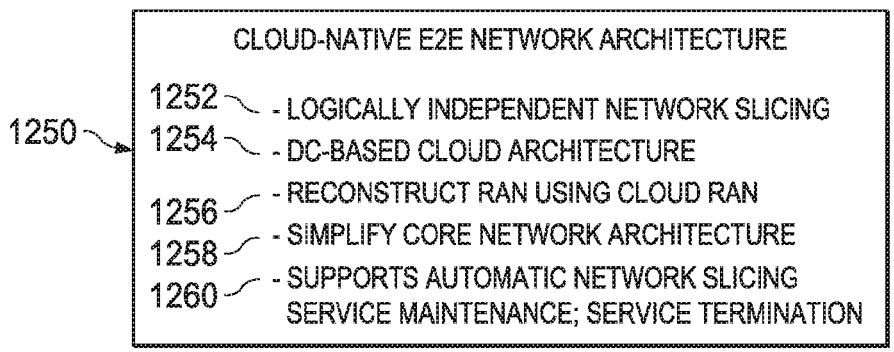
FIG. 12B illustrates a single network infrastructure supporting different services and applications.

As shown in FIG. 12B, in this architecture, a single network infrastructure can support different services and applications. This Cloud-Native E2E network architecture 1250 has the following attributes. The architecture 1250 provides logically independent network slicing 1252 on a single network infrastructure for different service requirements and provides DC-based cloud architecture 1254 to support various application scenarios. The architecture 1250 further uses Cloud RAN and RAN Slicing 1256 to reconstruct radio access networks (RAN) to support massive connections of multiple standards and implement on-demand deployment of RAN functions. The architecture 1250 also simplifies core network architecture 1258 to support on-demand network functions through control and user plane separation and unified database management. Finally, the architecture 1250 supports automatic network slicing service generation, maintenance, and termination for different services 1260 to reduce operating expenses.

New communication requirements for different services are difficult on existing networks in terms of technologies and business models. The next-generation mobile network must support different demands from different applications in different industries on a single network. The international telecommunications union (ITU) has classified 5G mobile network services into three categories: Enhanced Mobile Broadband (eMBB), Ultra-reliable and Low-Latency Communications (uRLLC), and Massive Machine Type Communications (mMTC). The eMBB service targets people's demand for a digital lifestyle and focuses on services that have high requirements for bandwidth, such as high definition (HD) videos, virtual reality (VR), and augmented reality (AR). The high bandwidth requirements are supported by using SDR-based massive MIMO. The uRLLC service focuses on latency-sensitive services, such as assisted and automated driving, and remote management. The mMTC service focuses on services that include high requirements for connection density, such as smart city and smart agriculture. However, a network is needed where all of these different types of networks are possible on one infrastructure and allow network slicing E2E. The described system enables enhanced mobile broadband (eMBB), ultra-reliable low latency communications (URLLC) and massive machine type communication (mMTC) to each be provided on a single infrastructure using end-to-end network slicing.

A number of traditional industries, such as automotive, healthcare, energy, and municipal systems participate in the construction of this ecosystem. 5G allows digitalization process from personal entertainment to society interconnection. The driving forces behind the network architecture transformation include the following aspects. A first factor involves complex networks incorporating multiple services, standards and sites. 5G networks must be able to provide diversified services of different KPIs, support co-existent accesses of multiple standards (5G, LTE, and Wi-Fi), and coordinate different site types (macro, micro, pico base stations as well as massive MIMO). The design challenge to create a network architecture capable of supporting such flexibility while meeting differentiated access demands is very complex to optimize. Another factor involves coordination of multi-connectivity technologies. 5G is expected to co-exist with LTE and Wi-Fi for a long time incorporating multi-connectivity technologies and the new 5G air interface. Multi-connectivity technologies must be coordinated based on traffic and mobility requirements of user equipment to provide sufficient transmission throughput and mobile continuity.

The network must also provide on-demand deployment of services on the site or on the access cloud side. 5G network architecture will be designed based on access sites and three-layer DCs. According to different service requirements, fiber/optic cable availability and network resource allocations, RAN real time and non-realtime resources can be deployed on the site or on the access cloud side. This requires that the service gateway location may also be deployed on the access cloud or on the core network side. The network must also provide for flexible orchestration of network functions. Service requirements vary with different network functions. A eMBB service requires a large throughput for scheduling. A uRLLC service requires ultra-low latency and high reliability. Networks must flexibly orchestrate network capabilities considering service characteristics, which significantly simplify network functions and increase network efficiency. Finally, a network must provide a shorter period of service deployment. Different services have expanded the mobile network ecosystem and increased network deployment complexity. Rapidly deploying new services requires better lifecycle management processes involving network design, service deployment, and O&M to rapidly deploy new services.

The service-driven 5G network architecture has to be flexible and efficiently support diversified mobile service requirements. This is achieved using a combination of SDN 1208 and NFV 1206. With software-defined networking (SDN) 1208 and Network Functions Virtualization (NFV) 1206 supporting the underlying physical infrastructure, 5G comprehensively cloudifies and can further virtualize access, transport, and core networks. Cloud solutions 1210 can better support diversified 5G services, and enables the key technologies of E2E network slicing, on-demand deployment of services, and component-based network functions.

CloudRAN 1256 would include sites and mobile cloud engines. This architecture 1250 coordinates multiple services, operating on different standards, in various site types for RAN real time resources that require many computing resources. Networks implement policy control using dynamic policy in the unified database on the core network side. Component-based control planes and programmable user planes allow for network function orchestration to ensure that networks can select control-plane or user-plane functions according to different service requirements. The transport network consists of SDN controllers and underlying forwarding nodes. SDN controllers generate a series of specific data forwarding paths based on network topology and service requirements to implement network optimization or open network capabilities in the API. The top layer of the network architecture implements E2E automatic slicing and network resource management 1260.

Figure 12C:
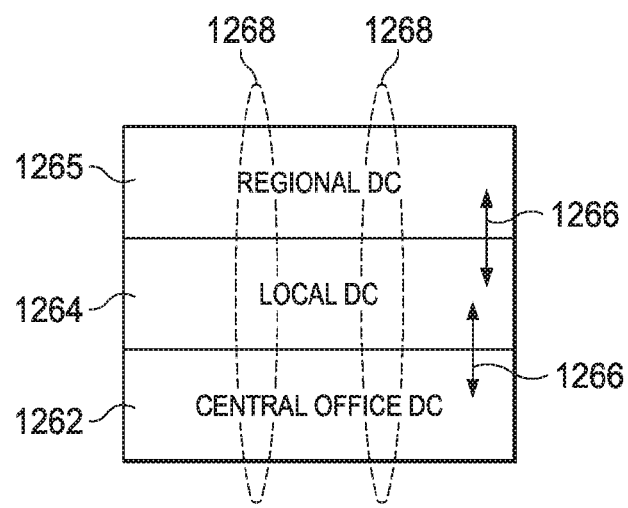
FIG. 12C illustrates a three layer cloud data center.

E2E network slicing 1252, 1260 is a foundation to support diversified 5G services and is key to 5G network architecture evolution. Based on NFV 1206 and SDN 1210, physical infrastructure of the future network architecture would include sites and three-layer DCs. Sites support multiple modes (such as 5G, LTE, and Wi-Fi) in the form of macro, micro, and pico base stations and corresponding massive MIMO at different bands to implement the RAN real time function. These functions have high requirements for computing and real-time performance and require dedicated hardware. As shown in FIG. 12C, three-layer cloud DC includes computing and storage resources. The bottom layer 1262 is the central office DC, which is closest in relative proximity to the base station side. The second layer 1264 is the local DC, and the third layer 1265 is the regional DC, with each layer of arranged DCs connected through transport networks 1266.

As discussed previously based on this architecture to diversify services, networks have topologies and a series of network function (network slices 1268) for each corresponding service type using NFV 1206 on a unified physical infrastructure. Each network slice 1268 is derived from one unified physical network infrastructure, which reduces operators' network costs. Network slices 1268 feature a logical arrangement and are separated as individual structures, which support customizable service functions and independent O&M.

As indicated, eMBB, uRLLC, and mMTC are independently supported on a single physical infrastructure. The eMBB slicing has high bandwidth requirements and has to cache in the mobile cloud engine of a local DC 1264, which supports high-speed services located close to users, reducing bandwidth requirements of the backbone network. The uRLLC slicing has strict latency needs in application of self-driving, assistant driving, and remote management and must be deployed in the mobile cloud engine of the central office DC 1262 (closer to the end user). V2X Server and service gateways must be deployed in the mobile cloud engine of the central office DC 1262, with only control-plane functions deployed in the local 1264 and regional DCs 1265. The mMTC slicing has low network data interaction and a low frequency of signaling interaction in most mMTC applications and the mobile cloud engine can be located in the local DC, with other functions. Therefore, mobile cloud engine can be in the local DC 1264, and other functions and application servers can be deployed in the regional DC 1265, which releases central office 1262 resources and reduces operating expenses.

Figure 13:
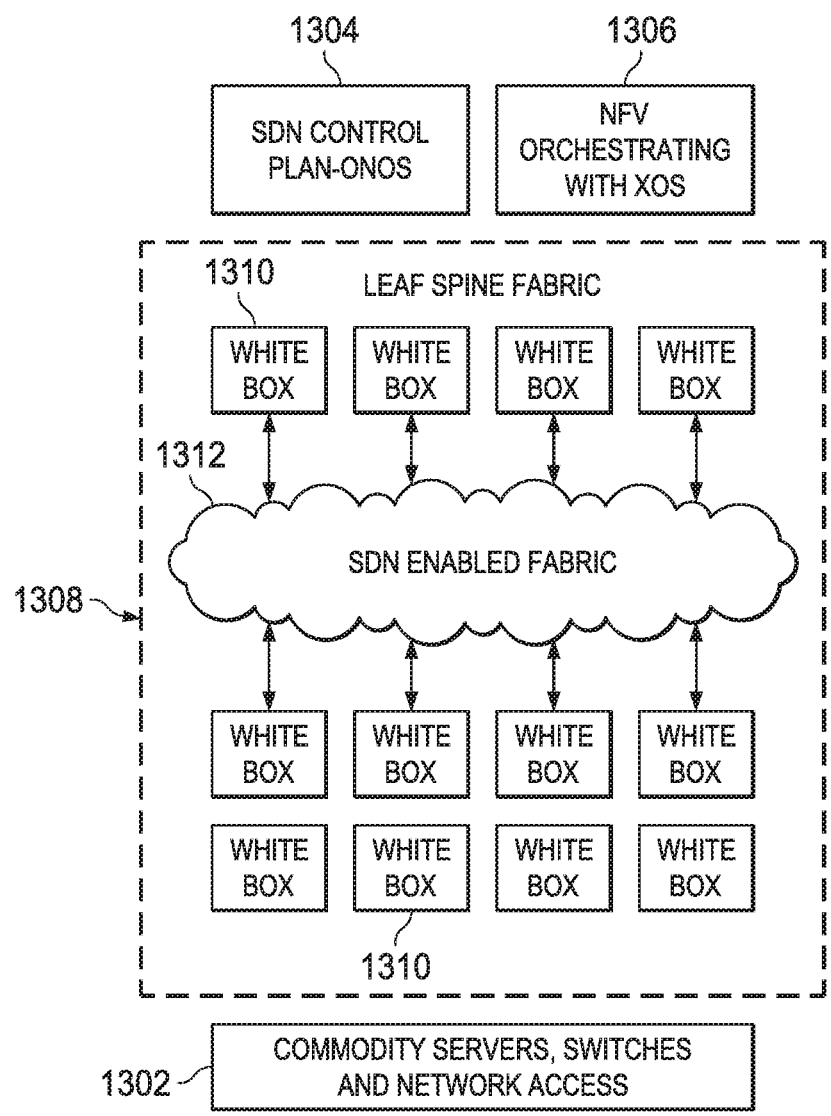
FIG. 13 illustrates the virtualization of the central office to the data center.

FIG. 13 more particularly illustrates the virtualization of the central office 1202 to the data center 1204 using the combination of NSV 1206, SDN 1208 and the cloud 1210. The process uses a number of commodity servers, switches and network access devices 1302 that may be used in combination with SDN control 1304 and NFV orchestration 1306. An inter connection of services and processes are implemented within a leaf spine fabric 1308 using a network of white boxes 1310 that comprise various types of generic network components that are interconnected via an SDN enabled fabric 1312. In SDN and FNV, the defined control structure enables the white boxes 1310 to be utilized in a desired manner or even repurposed in order to provide the virtualized network.

Figure 14:
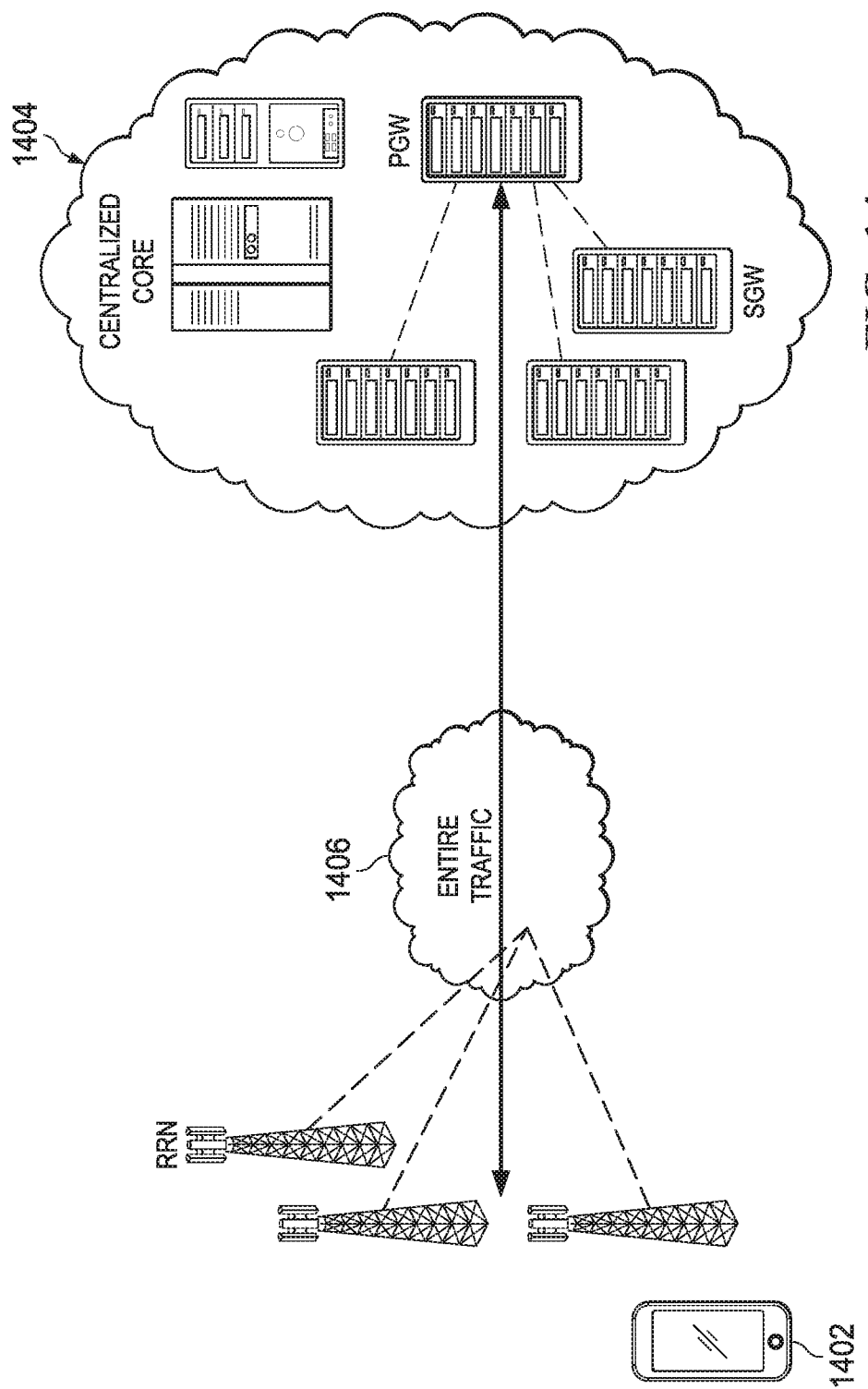
FIG. 14 illustrates the manner in which traditional mobile services are provided to a user device.

Virtualization of the central office enables the use of mobile edge services. Referring now to FIG. 14, there is illustrated the manner in which traditional mobile services are provided to a user device 1402. In this case, a centralized core 1404 transmits all traffic over a network 1406 connecting the centralized core 1404 to the user device 1402. Within traditional mobile service architecture all services are processed at the central core 1404. This requires overloading of the backhaul transport and core EPC. This provides for an inefficient use of network resources and causes a deterioration of the quality of experience of users. This type of implementation can also lead to over provisioning in order to handle peak traffic hours.

Figure 15:
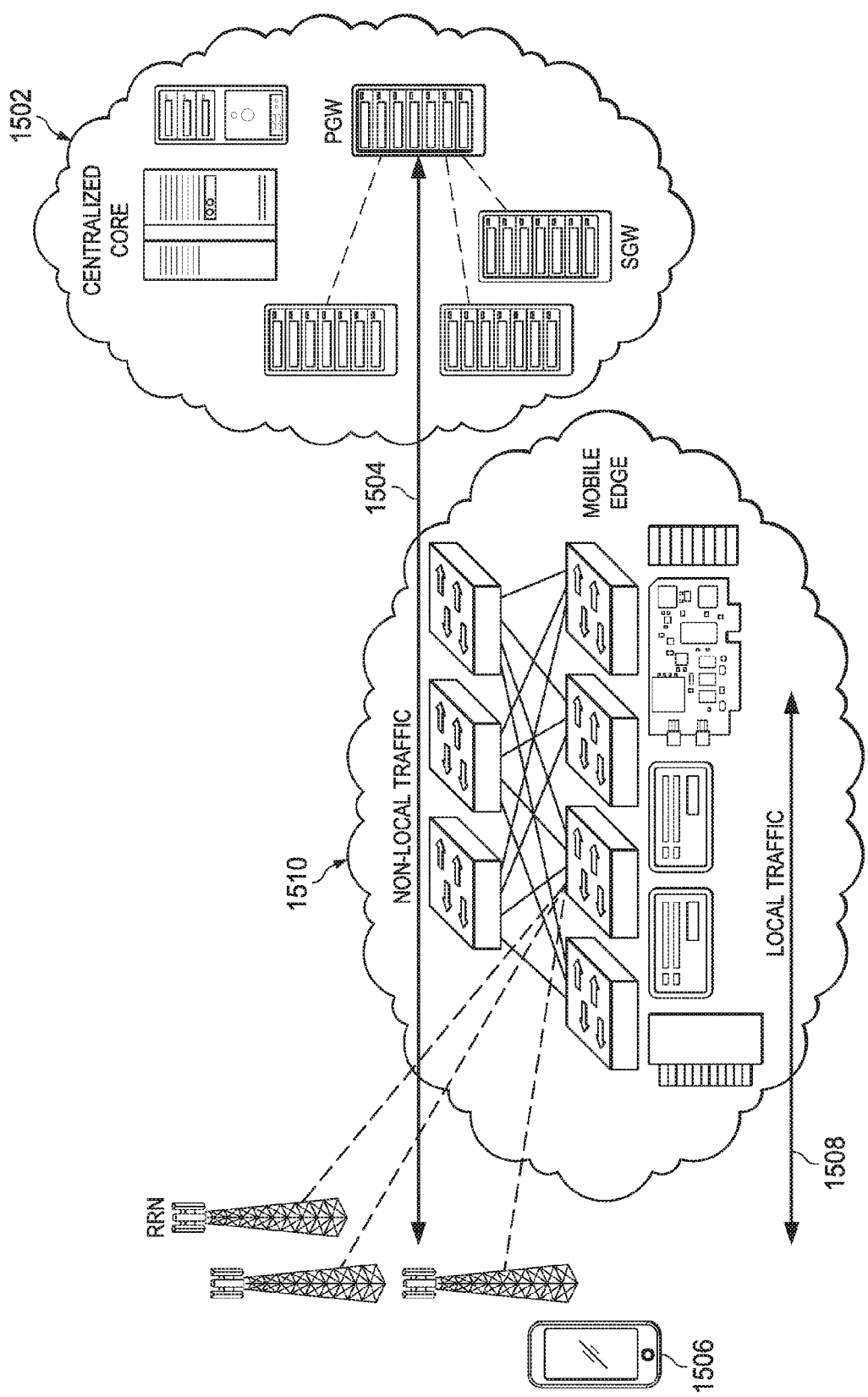
FIG. 15 illustrates a mobile edge computing services system.

FIG. 15 illustrates a mobile edge computing services system wherein the centralized core 1502 communicates only nonlocal traffic 1504 with the user device 1506. With respect to local traffic 1508, a mobile edge network 1510 is used for calculations and determinations in order to locate the processing and communications locally and more closely to the user device 1506. Services that can be processed at the edge network 1510 use M-CORD (mobile central office to data center) systems. Mobile edge services provide the advantage of being proximately located to end users. Mobile edge services provides for innovative and customized services that target customers (Internet of things, smart cities, education, industrial M2M, etc.) mobile edge services provide better efficiencies and new revenue opportunities for system operators.

Thus, CORD has emerged as an important service provider solution platform that brings the economy of the data center and the agility of a cloud. M-CORD integrates disaggregated/virtualized RIN and EPC with mobile edge services into CORD. M-CORD includes the integration of disaggregated eNB and provides connectionless service for Internet of things use cases.

MPEG-DASH is an ISO open standard for the adaptive delivery of segmented control (dynamic adaptive streaming over HTTP). Dash-Based compression in the mobile edge provides for bit rate trimming, bandwidth minimization, low latency options, HTTP delivery and improve throughput. The key differentiator of DASH, as opposed to any of the other HTTP streaming formats, is its open standard configuration.

Figure 16:
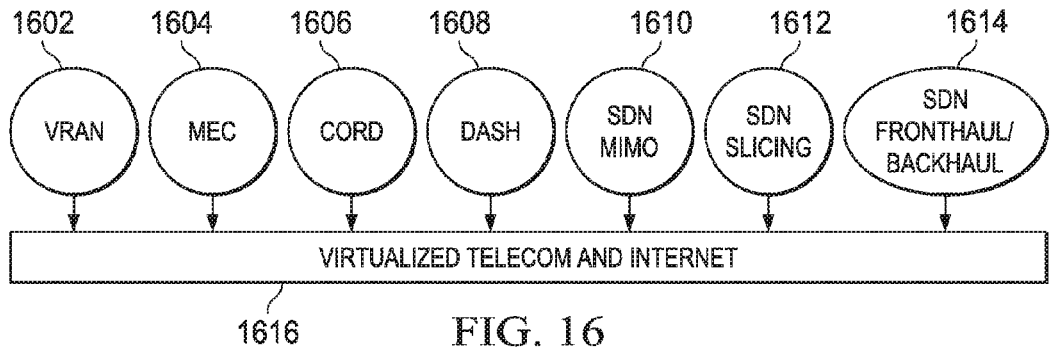
FIG. 16 illustrates the manner for creating a virtualized cloud architecture for telecom and Internet.

Thus, referring now to FIG. 16, by using a cloud native architecture (for example 5G architecture) various combinations of one or more of virtual radio access networks (VRAN) 1602, mobile edge computing (MEC) services 1604, CORD 1606, Dash-based compression 1608, SDN-based massive MIMO 1610, SDN-based end-to-end network slicing with massive MIMO 1612 to optimize the quality of experience for a given application on a same infrastructure, and SDN-based backhaul/fronthaul 1614 ultrabroadband virtualized telecom and internet services 1616 may be provided.

Software-Defined Networks and Network Function Virtualization

Figure 17:
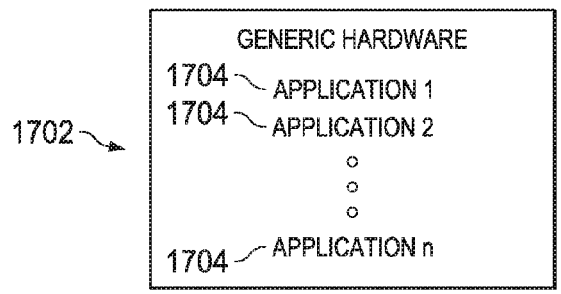
FIG. 17 illustrates a network function virtualization.

Diverse proprietary network hardware boxes increase both the capital and operational expense of service providers while causing problems of network management. Network function virtualization (NFV) addresses these issues by implementing network functions as pure software on commodity and generic hardware. Thus, as shown in FIG. 17, a generic off-the-shelf hardware 1702 may be used to generate a variety of system applications 1704 that are programmed into the hardware. NFV allows flexible provisioning, deployment, and centralized management of virtual network functions. Integrated with Software Defined Networks (SDN), the software-defined NFV architecture further offers agile traffic steering and joint optimization of network functions and resources. This architecture benefits a wide range of applications (e.g., service chaining) and is becoming the dominant form of NFV. Herein below, we introduce development of NFV under the software-defined NFV architecture, with an emphasis on service chaining as its application to Backhaul, Fronthaul and last mile wireless Internet Access. The software-defined NFV architecture is introduced as the state of the art of NFV and presents relationships between NFV and SDN. Finally, significant challenges and relevant solutions of NFV are described and its application domains (i.e. BH/FH/Access) are discussed.

Current network services rely on proprietary boxes and different network devices that are diverse and purpose-built. This situation induces network management problem, which prevents the operation of service additions and network upgrades (ossification). To address this issue and reduce capital expenditures (CapEx) and operating expenditures (OpEx), virtualization has emerged as an approach to decouple the software from the supported hardware and allow network services to be implemented as software. ETSI proposed Network Functions Virtualization (NFV) to virtualize the network functions that were previously carried out by some proprietary dedicated hardware. By decoupling the network functions from the proprietary hardware boxes, NFV provides flexible provisioning of software-based network functionalities on top of an optimally shared physical infrastructure. It addresses the problems of operational costs of managing and controlling these closed and proprietary boxes by leveraging low cost commodity servers.

On the other hand, with the development of Software Defined Networking (SDN), the trend is to integrate SDN with NFV to achieve various network control and management goals (i.e. dynamic resource management and intelligent service orchestration). Through NFV, SDN is able to create a virtual service environment dynamically for a specific type of service chain, consequently the dedicated hardware and complex labor work to provide a new coming service request is avoided. In conjunction with the use of SDN, NFV further enables real-time and dynamic function provisioning along with flexible traffic forwarding.

Software-defined NFV leverages network virtualization and logically centralized intelligence to minimize the service providing cost and maximize the utilization of network resources. In this case, the obtained higher resource utilization will introduce less investigation on the hardware equipment, which on the other hand simplifies networking operations. Moreover, by automating current manually intensive network configuration, provisioning, and management, the time and operational complexity are significantly reduced and manual errors are dramatically decreased, which offers better scalability. On the other hand, especially in large scale networks, deploying and providing a new kind of service usually results in a long and repeated process that requires long cycles of validation and testing. By automating the control, management and orchestration, the deployment time and operation cost will be significantly reduced.

Service chaining is the main area of software-defined NFV. In current networks, a service chain includes a set of hardware dedicated network boxes offering services such as load balancers, firewall, Deep Packet Inspection (DPI), Intrusion Detection System (ID S), etc., to support a dedicated application. When a new service requirement is added, new hardware devices must be deployed, installed and connected, which is extremely time-consuming, complex, high-cost and error-prone. This kind of networking service requires a dedicate plan of networking changes and outages, which requires high OpEx. On the other hand, the architecture of software-defined NFV is able to simplify the service chain deployment and provisioning. It enables easier and cheaper service provisioning in the local area networks, enterprise networks, data center and Internet service provider networks, wireless operator networks and their backhaul, fronthaul and last mile access networks.

The following introduces the state-of-the-art of NFV and its main challenges within the software-defined NFV architecture. Service chaining is highlighted and discussed as a core application of NFV in different contexts. Guidelines are provided for developments of NFV in various applications to backhaul, fronthaul and last mile access.

Software-Defined Network Function Virtualization

To reduce CapEx and OpEx introduced by diverse proprietary hardware boxes, NFV exploits and takes advantage of the virtualization technology. NFV allows network operators and service providers to implement network functions in software, leveraging standard servers and virtualization technologies, instead of purpose-built hardware. Recent trends of increased user information demands, explosion of traffic and diverse service requirements further drive NFV to be integrated with SDN, forming the software-defined NFV architecture. This architecture offers great flexibility, programmability and automation to the operators in service provisioning and service modeling.

Diverse and fixed proprietary boxes make the service, deployment and testing of new systems increasingly difficult. NFV is a key technology to benefit IT virtualization evolution by separating the hardware network functions from the underlying hardware boxes by transferring network functions from dedicated hardware to general software running on commercial off-the-shelf (COTS) equipment, i.e., virtual machines (VMS). These software applications are running on standard IT platforms like high-performance switches, service, and storage. Using NFV, the different network functions can be deployed in different locations of the networks such as data centers, network nodes, and end-nodes of a network edge as required. Currently, the market of NFV includes switching elements, network elements, network services and applications. A summary of these include:

Network switching elements, i.e., Broadband Network Gateway (BNG), carrier grade NAT, Broadband remote access server (BRAS), and routers.

Mobile network devices, i.e., Home Location Register/ Home Subscriber Server (HLR/HSS), Serving GPRS Support NodeMobility Management Entity (SGSNMME), Gateway support node/Packet Data Network Gateway (GGSN/PDN-GW), RNC, NodeB and Evolved Node B (eNodeB) such as that disclosed in T. Wu, L. Rui, A. Xiong, and S. Guo, "An automation PCI allocation method for eNodeB and home eNodeB cell," in *Proc. IEEE 6th Int. Conf. Wireless Commun. Netw. Mobile Comput.* (*WiCOM*), September 2010, pp. 1-4, which is incorporated herein by reference in its entirety.

Virtualized home environments as described in A. Berl, H. de Meer, H. Hlavacs, and T. Treutner, "Virtualization in energy-efficient future home environments," *IEEE Commun. Mag.*, vol. 47, no. 12, pp. 62-67, December 2009 and R. Mortier et al., "Control and understanding: Owning your home net-work," in *Proc. IEEE 4th Int. Conf. Commun. Syst. Netw.* (*COMSNETS*), January 2012, pp. 1-10, each of which are incorporated herein by reference in its entirety.

Tunneling gateway devices, i.e., IPSec/SSL virtual private network gateways.

Traffic analysis elements, i.e., Deep Packet Inspection (DPI), Quality of Experience (QoE) measurement.

Service Assurance, Service Level Agreement (SLA) monitoring, Test and Diagnostics such as that described in H. Ludwig et al., "Web service level agreement (WSLA) language specification," IBM Corp., New York, N.Y., USA, Tech. Rep., 2003, pp. 815-824, which is incorporated herein by reference.

Next-Generation Networks (NGN) signaling such as Session Border Controller (SBCs), IP Multimedia Subsystem (IMS).

Application-level optimization devices, i.e., Content Delivery Network (CDNs), load balancers, cache nodes, and application accelerators such as that described in F. T. Leighton and D. M. Lewin, "Content delivery network using edge-of-network servers for providing content delivery to a set of participating content providers," U.S. Pat. No. 6,553,413, Apr. 22, 2003, which is incorporated herein by reference in its entirety.

Network security devices, i.e., Firewalls, intrusion detection systems, DOS attack detector, virus scanners, spam protection, etc. such as that described in E. D. Zwicky, S. Cooper, and D. B. Chapman, *Building Internet Firewalls*, Sebastopol, Calif., USA: O'Reilly Media, 2000, which is incorporated herein by reference in its entirety.

The major advantage of using NFV is to reduce middle dedicated hardware boxes deployed in the traditional networks to take the advantages of cost savings and bring flexibility. On the other side, NFV technology also supports the co-existence of multi-tenancy of network and service functions, through allowing the usage of one physical platform for different services, applications and tenants.

NFV Framework

Figure 18:
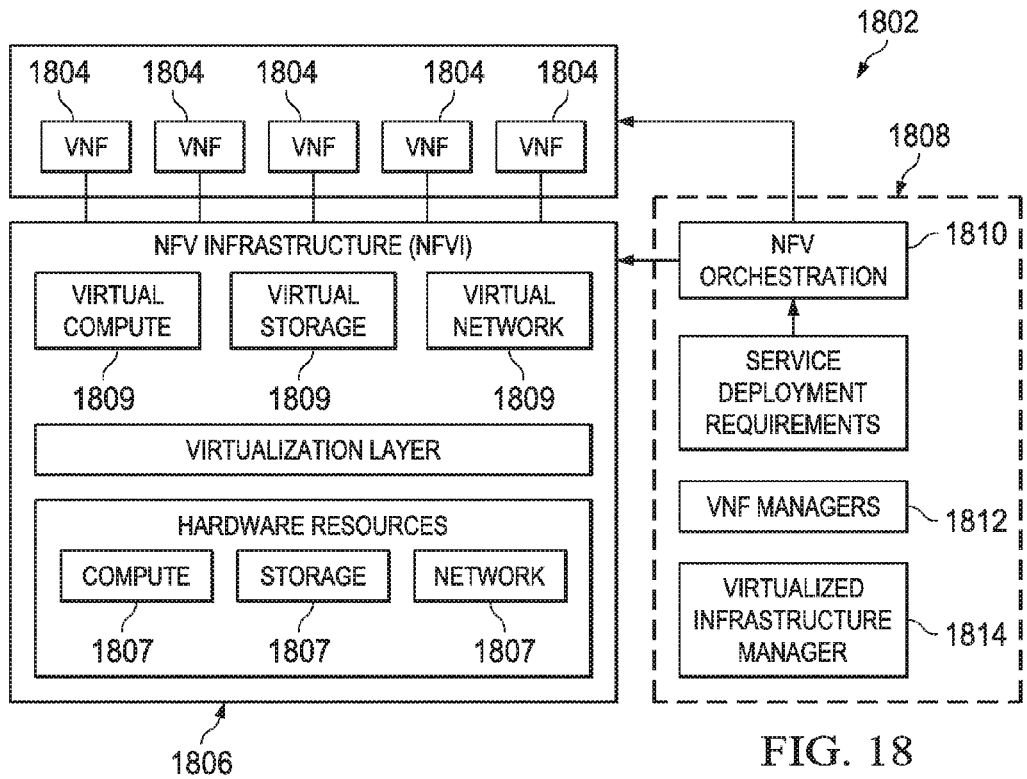
FIG. 18 illustrates a network function virtualization architectural framework.

ETSI defines the NFV architectural framework 1802 as illustrated in FIG. 18 enabling virtualized network functions (VNF) 1804 to be deployed and executed on a Network Functions Virtualization Infrastructure (NFVI) 1806, which consists of commodity servers 1807 to provide computing, storage and network functionalities wrapped with a software layer that logically partitions them. Above the hypervisor layer, a VNF 1804 is typically mapped to one VM (virtual machine) 1809 in the NFVI. The deployment, execution and operation of VNFs 1804 on the NFVI 1806 are steered by a Management and Orchestration (M&O) system 1808, whose behavior is driven by a set of metadata describing the characteristics of the network services and their constituent VNFs. The M&O system includes an NFV Orchestrator 1810 in charge of the lifecycle of network services, a set of VNF managers 1812 in charge of the life cycle of the VNFs and a virtualized infrastructure manager 1814, which can be viewed as an extended cloud management system responsible for controlling and managing NFVI resources.

Software-Defined Networks

A Software-Defined Network (SDN) is an important and recently emerging network architecture to decouple the network control from the data forwarding. With its inherent decoupling of the control plane from the data plane, SDN offers a greater control of a network through programming. This combined feature would bring potential benefits of enhanced configuration, improved performance, and encourages innovation in network architecture and operations. Especially, SDN offers a promising alternative for traffic steering by programmatically configuring forwarding rules as described in N. Handigol, S. Seetharaman, M. Flajslik, N. McKeown, and R. Johari, "Plug-n-serve: Load-balancing Web traffic using OpenFlow," in Proc. ACM SIGCOMM Demo, 2009, pp. 1-2, which is incorporated herein by reference in its entirety.

Figure 19:
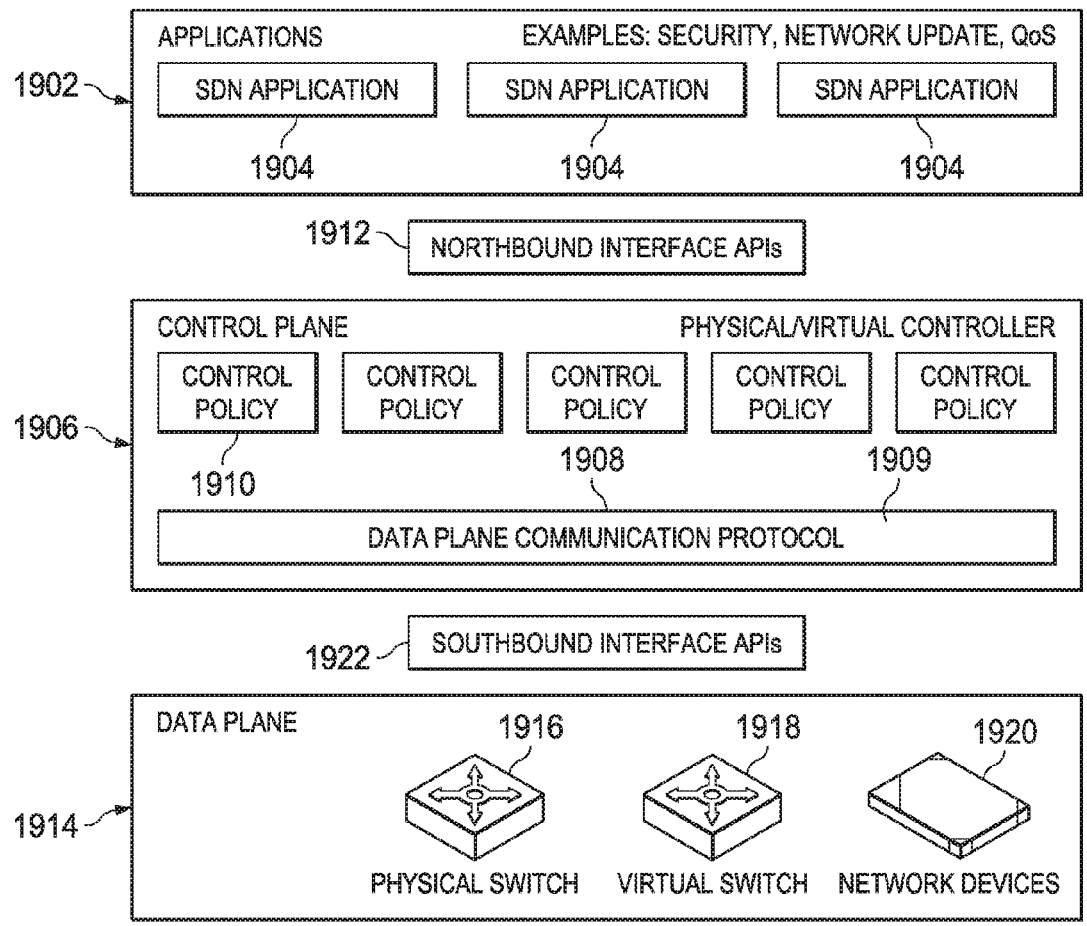
FIG. 19 illustrates software defined network architecture.

FIG. 19 depicts the SDN architecture. There are three different layers. The application layer 1902 covers an array of applications 1904 focusing on network services, and they are mainly software applications communicating with the control layer 1906. As the core of SDN, the control layer 1906 consists of a centralized controller 1908, which logically maintains a global and dynamic network view, takes requests from the application layer 1902, and manages the network devices via standard protocols 1909 using control policies 1910. Communications between the applications layer 1902 and the control layer 1906 occur through application program interfaces 1912. The data-plane layer 1914 provides infrastructure including switches, routers and network appliances through physical switches 1916, virtual switches 1918 and network devices 1920. In an SDN context, these devices are programmable and support standard interfaces. Communications between the control layer 1906 and the data plane layer 1914 occur via application program interfaces 1922.

The application layer 1902 utilizes the northbound APIs 1912 to communicate with the SDN controller 1906 (Control Plane Layer), which enable different control mechanisms for the networks. The southbound APIs 1922 define the communication interface between the controller layer 1906 and data plane devices within the data plane layer 1914, which enable the application to control the forwarding device is a flexible and programmable manner.

NFV Versus SDN

NFV and SDN are closely related and highly complementary to each other. NFV can serve SDN by virtualizing the SDN controller 1906 (which can be regarded as a network function) to run on the cloud, thus allows dynamic migration of the controllers to the optimal locations. In turn, SDN serves NFV by providing programmable network connectivity between virtual network functions (VNFs) to achieve optimized traffic engineering and steering. However, NFV and SDN are completely different from the concepts to the system architecture and functions, which are summarized by the following aspects.

Figure 20:
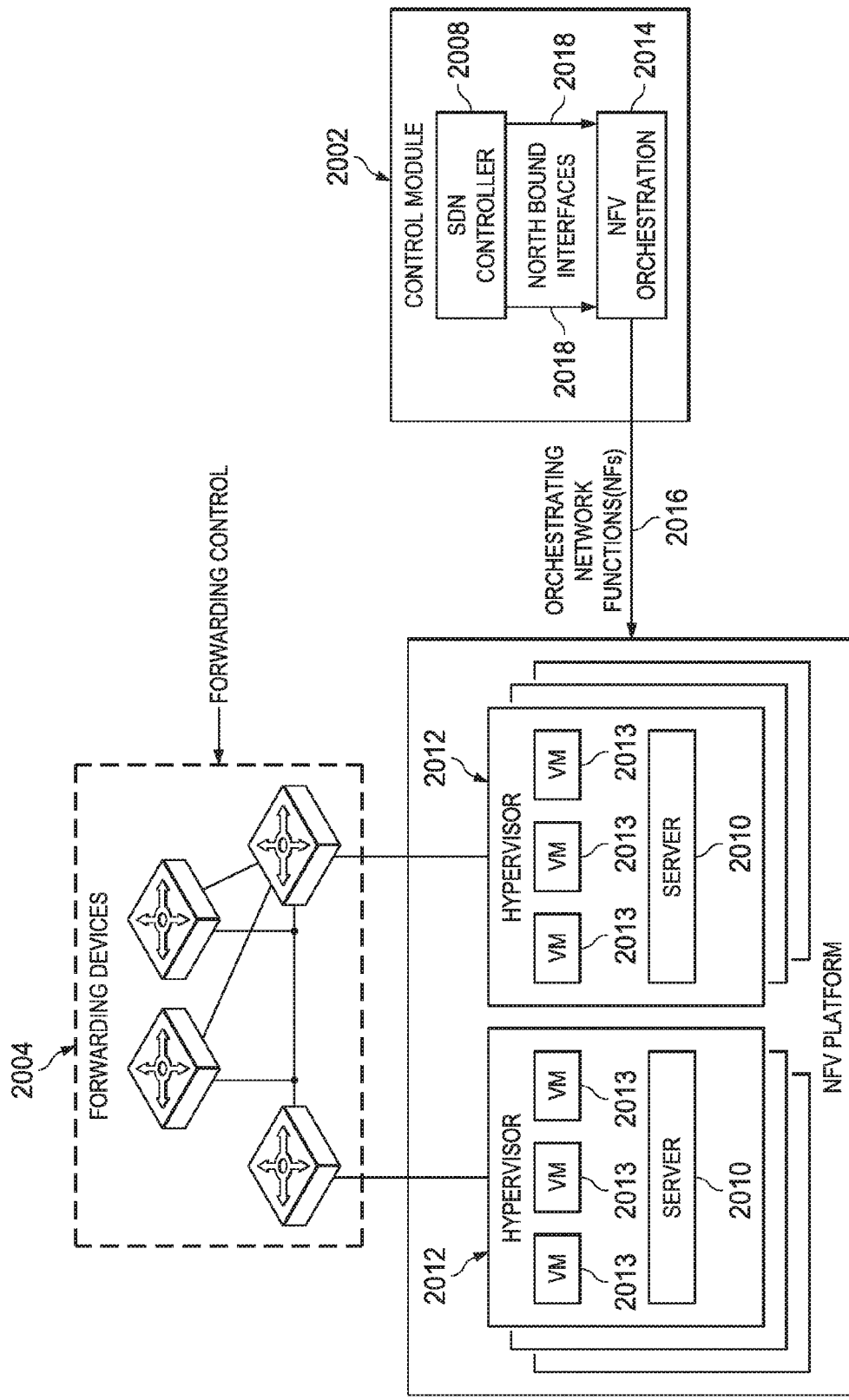
FIG. 20 illustrates a software defined network function virtualization system.

NFV is a concept of implementing network functions in software manner, while SDN is concept of achieving centrally controlled and programmable network architecture to provide better connectivity. NFV aims at reducing CapEx, OpEx, and space and power consumption, while SDN aims at providing network abstractions to enable flexible network control, configuration and fast innovation. NFV decouples the network functions from the proprietary hardware to achieve agile provisioning and deployment, while SDN decouples the network control plane from the data Software-Defined NFV Architecture The software-defined NFV system is illustrated in FIG. 20. The system consists of a control module 2002, forwarding devices 2004 and NFV platform 2006 at the edge of the network. The logic of packet forwarding is determined by the SDN controller 2008 and is implemented in the forwarding devices 2004 through forwarding tables. Efficient protocols, e.g., OpenFlow, can be utilized as standardized interfaces in communicating between the centralized controller 2002 and distributed forwarding devices 2004. The NFV platform 2006 leverages commodity servers 2010 to implement high bandwidth NFs (network functions) at low cost. Hypervisors 2012 run on the servers 2010 to support the VMs 2013 that implement the NFs. This platform 2006 allows customizable and programmable data plane processing functions such as middle box of firewalls, IDSs, proxies, which are running as software within virtual machines, where NFs are delivered to the network operator as pieces of pure software.

Figure 21:
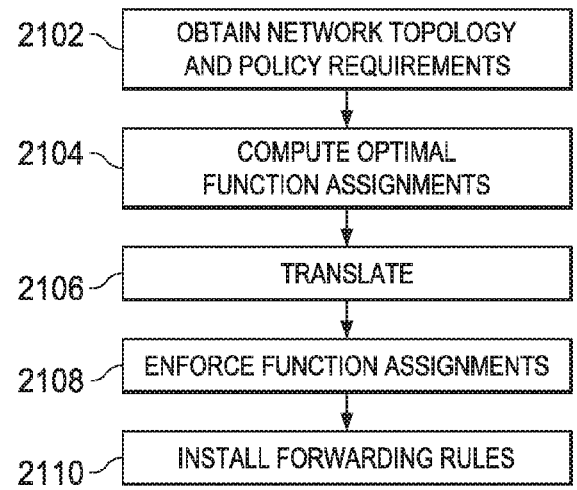
FIG. 21 illustrates a flow diagram describing a process for provisioning functions.

The SDN controller 2008 and the NFV orchestration system 2014 compose the logical control module 2002. The NFV orchestration system 2014 is in charge of provisioning for virtualized network functions 2016, and is controlled by the SDN controller 2008 through standard interfaces 2018. Referring now to FIG. 21, there is illustrated a process for provisioning functions. After obtaining the network topology and policy requirements at step 2102, the control module 2008 computes the optimal function assignments (assigning network functions to certain VMs) at step 2104 and translates at step 2106 the logic policy specifications into optimized routing paths. The function assignments are enforced at step 2108 by the NFV orchestration system 2014, and the controller 2008 steers the traffic traveling through the required and appropriate sequence of VMs 2013 and forwarding devices 2004 by installing forwarding rules into them at step 2110.

From Middle Box to NFV

Though NFV is not limited to virtualizing middle boxes, the concept of NFV was initiated in the context of middle box. The present disclosure introduces the evolution from a traditional purpose-built middle box to NFV, during which consolidated middle box and software-defined middle box act as transitional paradigms.

Middlebox Overview

A middle box is a networking forwarding or processing device that transmits, transforms, filters, inspects or controls network traffic for purposes of network control and management. A middle box service or function is a method or operation performed by a network device that needs specific intelligence about the applications. Typical examples of middle boxes include network address translators (NATs) that modify packet's destination and source addresses, and firewalls that filter unwanted or malicious traffic. The following are commonly deployed middle boxes:

1) Network Address Translator (NAT)
2) Firewall (FW)
3) Intrusion Detection System (IDS)
4) Load Balancer (LB)
5) WAN Optimizer
6) Flow Monitor (FM)

Consolidated Middlebox

Here, an overview for the efforts on consolidating middle boxes is provided, which are precursors to the current NFV paradigm.

1) CoMb
2) APLOMB
3) Integrate Middle Boxes into Network

Software-Defined Middlebox

As SDN evolves, the principles of abstracting the architecture layer of network from the control plane 1906 and data plane 1914 have been investigated in various contexts. This idea introduces some unique opportunities for the development of middle boxes. Inspired by the idea of SDN, some researchers proposed a software-defined middle box and corresponding networking architecture, with the aim of providing fine-grained and programmable control over the middle box state and network forwarding.

Service Chaining

Service chaining is an important model for network service providers, in which NFV plays an important role. It is utilized to organize the service function deployment, where the ability of specifying an ordered list of service processing for the service's traffic flows is provided. A service chain defines the required processing or functions and the corresponding order that should be applied to the data flow. These chains require the integration of service policy and the above applications to achieve optimal resource utilization.

Traditional service chaining mainly relies on manual configuration which is tedious, error-prone and clumsy. SDN provides new capabilities to steer traffic dynamically based on user requirements. However, hardware-based middle boxes limit the benefit of SDN due to their fixed functionalities and deployment. NFV is a good enabler for SDN. With the ability of dynamic function provisioning offered by NFV and the centralized control of SDN, new opportunities emerged in service chaining. Better performance and resource utilization can be achieved with the software-defined NFV architecture.

SDN & Middle Box Based Service Chaining

SDN offers the flexible control approach and enables dynamic traffic forwarding, and this style of traffic control for middle box-specific flow can realize flexible and efficient service chaining with no need to generate any placement or introduce some constraints on middle boxes, which are on the other hand easily supported by current SDN standards. The following are some of the important functions:

1) Symple
2) Steering
3) Flowtag

Service Chaining in the Software-Defined NFV Architecture

SDN and NFV together have the potential to benefit service operators, satisfy user service level agreements and accurately monitor and control network traffic, which further reduces and minimizes the operating cost. On one hand, NFV moves network functions out of dedicated hardware boxes to the software based on general hardware platform. SDN moves control functions out of the hardware and places it in the software controller. Therefore, the service deployment and service chains can be provided and reconfigured in the controller. In this way, not only flexible and dynamic operations are allowed, the chance for operation error and events will be much smaller because the network controller has an overall view, which reduces the probability of inconsistent configurations.

Moving the required network functions into software means that deploying the service chain no longer requires acquiring a dedicated middle box. In this case, the network functions execute as the software running on virtual machines with the control of a hypervisor 2012, which enable flexible computational and networking resource provisioning. Thus, since the computational capacity can be increased when required, there's no need to over-provision. On the other hand, software-defined NFV service chaining also helps the network upgrade process. For geographically distributed networks, upgrading network devices is costly. Moreover, the errors in the network updates and re-configuration can bring down the entire network. However, with the software-defined NFV, service providers are able to create new chains without radically changing hardware. Finally, service operator can utilize these service chaining techniques by themselves, instead of using third party providers. With intelligent service chaining, complexity of resource provisioning is significantly reduced. Thus, service providers can deliver services on demand without the help of third parties.

Figure 22:
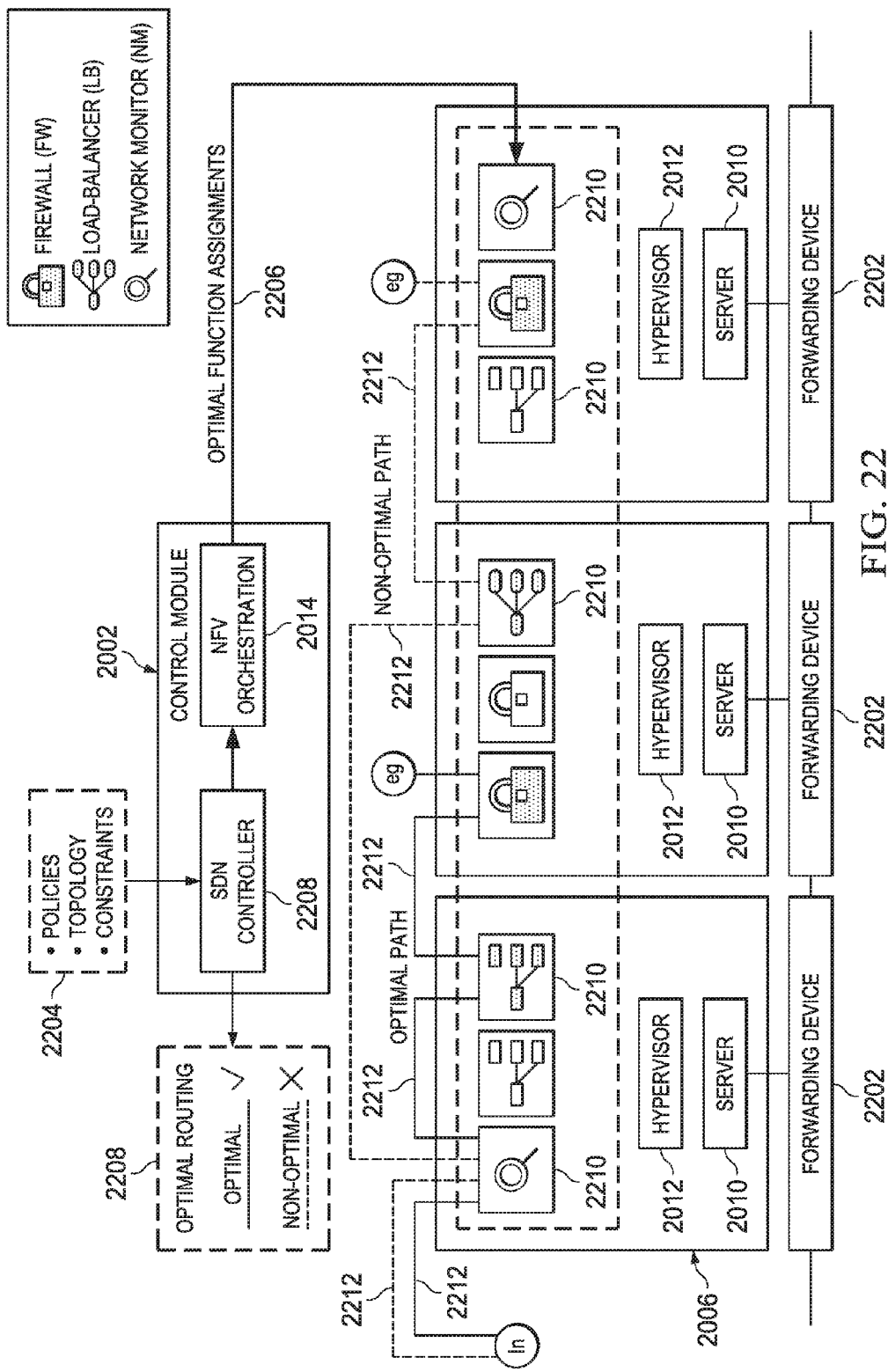
FIG. 22 illustrates an example of a service chaining process.

FIG. 22 illustrates an example of the service chaining process. Within a software-defined NFV architecture, a unified control and orchestration framework 2002 is required to integrate the SDN controller 2008, forwarding elements 2202 and virtual network functions 2073. Moreover, due to the existence of dynamic function and resource provisioning, this framework should also provide coordinated control of both network forwarding state and network functions states. Taking user policies 2204 as inputs, the control module 2002 assigns the NFs 2206 fulfilling these services in an optimal way and meanwhile the optimal routing paths 2208 of all policies are selected taking account of the resource constraints. The service functions 2210 are then chained by the centralized controller and the traffic flows 2212 are steered according to the service chains.

Challenges and Problems of Network Function Virtualization

NFV is an important innovation and a promising approach for the service operators and providers. However, it also faces several challenges. Here the corresponding challenges, open problems, and related solutions are summarized with the classifications organized in Table 1.

Function Virtualization

The virtualized functions should meet performance requirements to support packet processing at line-rate for multiple tenants. First, since neither the hypervisors 2012 nor the virtual machines 2073 have been optimized for the processing of the middle box, obtaining high performance, i.e., high I/O speed, fast packet processing, short transmission delays, etc. from standard servers is the main challenge for function virtualization. Further, as a server may implement a large amount of functionality, their platforms should host a wide range of virtual machine 2013 and software packages. Finally, NFV hardware and software platforms should support multi-tenancy, because they are concurrently run by software belonging to the different operators. These co-located VNFs 1804 should be isolated not only from a security but also a performance point of view. Here is a summary of some important related works on function virtualization.

1) DPDK is a set of libraries and drivers for fast packet processing for the network functions. DPDK can be run on a wide range of processors. However, the DPDK system has some limitation to support virtualization as it cannot support flexible, high performance functionality in the NFV environment.

2) NetVM is a software platform for running diversity network functionality at line-speed based on the general commodity hardware. It takes advantage of DPDK's high throughput packet processing capabilities, and further enables flexible traffic steering and overcomes the performance limitations of hardware switching. Thus, NetVM provides the capability to support network function chains by flexible, high-performance network elements.

3) ClickOS is a high-performance, virtualized software network function platform. It provides small, quickly booting, and little delay virtual machines, and over one hundred of them can be concurrently run while guaranteeing performance on a general commodity server. To achieve high performance, ClickOS relies an extensive overhaul of Xen's I/O subsystem to speed up the networking process in middle boxes. ClickOS is proof that software solutions alone are enough to significantly speed up virtual machine processing, to the point where the remaining overheads are dwarfed by the ability to safely consolidate heterogeneous middle box processing onto the same hardware.

Portability

The NFV framework is expected to support the loading, executing and moving of VNFs 1804 across different but standard servers in multi-vendor environments. This capability is known as portability. These virtualized network functions defeat the portability goal and key benefits of NFV, namely the capability of multi-tenancy and resource isolation. The portability challenge is how to achieve high performance leveraging hardware accelerators and at the same time have hardware independent NFs. This approach ensures that the VNFs 1804 are OS-independent and resource isolation is also guaranteed since the VNFs 1804 are executed on independent VMs and are decoupled from the underlying OS by the hypervisor layer.

Standard Interfaces

NFV relies on existing infrastructure to touch the customer. In this case, it is also highly unlikely that an upgrade of the physical network or entire operational support systems will be feasible. This is a management software integration challenge with the interfaces between NFV and underlying infrastructure. On the other hand, the interfaces between the centralized controller and VNFs 1804 should also be standardized. To smoothly bridge NFV with upper and lower layers, the VNFs 1804 and the underlying computing platform should be described by standard templates that enable flexible control and management. Thus, north- and south-bound interface APIs 1912, 1922 need to be developed. North-bound interface 1912 interactions are used to control and manage functions to different types of instances, e.g., physical servers, VM 2013 and VNFs 1804. Since network functions need service-oriented APIs to be controlled directly or indirectly, each network service has a specific operation policy and SLA. Moreover, VNFs 1804 could use the north-bound API 1912 for the requests. On the other hand, the south-bound APIs 1922 are utilized to communicate with the NFVI 1806 and request information from other framework entities. Thus, how to design a flexible and efficient API for both the north-bound and south-bound communications are important problems in the research and development of NFV technologies.

Function Deployment

Fine-grained deployment, control and management of network functions are needed in the context of NFV-enabled network nodes, for various optimization purposes. Thus, many challenges are related to algorithm and system design of function deployment.

One of these challenges is to automatically provide network and function process resources according to the usage of the resources involved. A similar and probably even more important challenge is to achieve automatic placement and allocation of the VNFs 1804, since the placement and assignment of the VNFs 1804 significantly impact the performance of service chaining. Both automated provisioning and placement require a global view of the resources and a unified control and optimization system with various optimization engines running in it. Another issue is to translate higher-level policies, which are generated from the resource allocation and optimization mechanisms, into lower level configurations. Templates and standards should be developed to guarantee automated and consistent translation. For example, when there is a need to achieve a high-level goal of reducing the networking transmission delay, the optimization engine may require an algorithm to provision and place virtual functions ensuring that the least overall transmission delay is achieved. Conversely, when it is required to achieve the minimum or maximum link utilization, it would need a different optimization engine with a different algorithm. For more effective operation and control, the optimization approach should support real-time swap to make provisioning and placements that dynamically match the high-level policies from the operator and application.

Traffic Steering

SDN offers the new agility of traffic steering by allowing the network operators and service providers to specify a logical control policy, and then automatically translates this into data plane 1914 forwarding rules. Prior to this, the routing paths are carefully selected by the optimization framework taking into account the physical topology, link capacities, and network resource constraints. Solid work has been done on traffic steering in hardware based middle box systems. However, in the software-defined NFV architecture, traffic steering is jointly optimized with NFV deployment that can achieve better composition. However, the unified optimization paradigm also makes the optimization problem difficult to solve since more variables are introduced. To achieve online computing of traffic steering, heuristic algorithms should be designed to reduce the computing complexity.

TABLE 1

| Challenges | Description | Solution |
| --- | --- | --- |
| Function Virtualization | Virtualized functions should meet certain requirements to support packet processing at line-rate:<br>(1) High performance (high I/O speed, fast packet processing, short transmission delays, etc.)<br>(2) Support multi-tenancy<br>(3) OS-independent | Important related works:<br>(1) DPDK, a set of libraries for fast packet processing.<br>(2) NetVM, a system for running network functionality and middlebox at line-speed in general commodity hardware.<br>(3) ClickOS, a small, quick-boot, low-delay, virtualized software middlebox platform. |
| Portability | The NFV framework is expected to load, execute and move VNFs across different but standard servers in multi-vendor environments. This capability is known as portability. | Deploying network functions via a virtual software environment enhances the portability. This approach ensures that the VNFs are OS-independent and resource isolation is also guaranteed. |
| Standard Interfaces | Standardized API should be developed to enable NFV to reach the customers via underlying infrastructure and to be centrally controlled and managed. | Both VNFs and computing resources are described via standard templates. Normalized north- and south-bound should be developed between these layers. |
| Function Deployment | Fine-grained deployment, control and management of network functions, are needed in the context of NFV-enabled network nodes, for various optimization purposes. | A monitoring system collecting and reporting on the behavior of the resources, and a unified control and optimization system with various optimization engines should be developed. |
| Traffic Steering | In the software-defind NFV architecture, traffic steering should be jointly optimized with function deployment, making the optimization problem difficult to solve. | To achieve online computing of traffic steering, heuristic algorithms should be designed to reduce the computing complexity. |

Applications

Software-defined NFV technology is used for delivering significant benefits in niche applications today, while its full scale use and benefits have yet to be achieved. The following describes the major domains that will dominate the software-defined NFV scenario over next few years.

Cloud-Computing

Cloud computing enables globally distributed services and enterprises to quickly deploy, manage and optimize their computing infrastructure dynamically. Partitioning or replicating a service across multiple globally distributed instances allow these services to move closer to the users thus providing richer user experiences, avoid infrastructure bottlenecks, and implement fault tolerance.

NFV is an enabler of such dynamic service provisioning. By replacing service elements with virtual network functions, new functions can be added or improved by updating a software image, rather than waiting for a vendor to develop and manufacture a dedicated box. Furthermore, while integrated with SDN, service providers can express and enforce application traffic management policies and application delivery constraints at the required level of granularity.

NFV allows service providers to provide better services to the users by dynamically changing their deployment topologies or traffic allocations based on user access patterns, user consumption and mobility, infrastructure load characteristics, infrastructure failures and many such situations that may cause service degradation, disruption or churn. Similarly, replicated service instances might need to be moved/instantiated/released to mask infrastructure failures, load conditions, or optimize the deployment based on consumption patterns and social interaction graphs. NFV can also provide intelligent infrastructure support for such dynamic service deployment scenarios. Moreover, since NFV offers good support for multi-tenant usage, it is available for wide area dynamic multi-cloud environments that can be shared by multiple providers to implement their specific distributed service delivery contexts.

Below are summarized some important works trying to implement NFV in clouds:

1) CloudNFV
2) THE REALTIME CLOUD
3) CLOUDBAND

Mobile Network

NFV considers all network functions for virtualization through well-defined standards, i.e., in mobile network, NFV targets at virtualizing mobile core network and the mobile-network base station. NFV also benefits data centers owned by mobile service providers, including mobile core network, access networks and mobile cloud networks.

For the core networks, which are the most important part of mobile networks, NFV allows the cellular providers to adopt a network more akin to the data centers, which consist of simple forwarding devices 2004, with most functionality executed in commodity servers that are close to the base stations. Some network functions can even be fulfilled by packet-processing rules installed directly in the switches. In the system, a logically centralized controller is able to steer the network traffic through the required network functions to realize service chaining.

For the access networks, the base stations are being virtualized as well. Thus, SDN and NFV are applied to the wireless access networks to sharing their remote base station infrastructure to achieve better coverage and services with the minimum investment of CapEx and OpEx.

Enterprise Network

NFV is also being utilized in the enterprise network. Network managers would like to consume as much or as little of the network as they need, but there is a gap between what enterprise customers want and what service providers can offer today, which can be address by NFV. It enables the dynamic provisioning of virtual network services on commodity servers within minutes instead of months.

NFV for the enterprise will require their platform to become more comfortable embracing software L4-7 services, as well as changes in their operation models. An understanding of how to optimize performance with DPDKs, and potentially even looking at programmable hardware is critical. Another challenge is the time and process it takes to re-architect monolithic services that were predominantly deployed for north-south traffic.

A comprehensive overview of NFV within the software-defined NFV architecture is provided. NFV and its relationship with SDN has been introduced. The evolution of NFV has been reviewed and the discussion has covered how middle boxes evolved to virtual network functions. In particular, service chaining as a typical application of NFV has been described. Furthermore, software defined NFV challenges and possible solutions were covered. Next, a discussion of how to take the SDN and NFV concepts and leverage them in planning, designing and implementing a wireless backhaul, fronthaul and last mile access networks using standard based protocols as well as open source protocols will be provided.

It will be appreciated by those skilled in the art having the benefit of this disclosure that this ultra-broadband virtualized telecom and internet provides more flexible broadband network capabilities. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing a dynamically configurable network between a core network and at least one user device responsive to an application or service being used by the at least one user device, comprising:
   a radio access network for providing a first communications link with the at least one user device, the radio access network including a first plurality of control layers;
   a backhaul network for connecting the radio access network to the core network, the backhaul network including a second plurality of control layers;
   at least one server for implementing at least a portion of the radio access network and the backhaul network within the at least one server; and
   wherein the at least one server is configured to select a first slice portion of the first plurality of control layers of the radio access network and a first slice portion of the second plurality of control layers of the backhaul network to support operation of a first application or service and to select a second slice portion of the first plurality of control layers of the radio access network and a second slice portion of the second plurality of control layers of the backhaul network to support operation of a second application or service.

2. The system of claim 1, wherein the at least one server is further configured to implement a data center (DC) based cloud architecture.

3. The system of claim 2, wherein the at least one server is further configured to select a first slice portion of the DC based cloud architecture to support operation of the first application or service and to select a second slice portion of the DC based cloud architecture to support operation of the second application or service.

4. The system of claim 1, wherein the at least one server is further configured to select the first slice portion of the first plurality of control layers of the radio access network and the first slice portion of the second plurality of control layers of the backhaul network to support enhanced mobile broadband (eMBB) to select the second slice portion of the first plurality of control layers of the radio access network and the second slice portion of the second plurality of control layers of the backhaul network to support ultra-reliable low latency communication (uRLLC) and to select a third slice portion of the first plurality of control layers of the radio access network and the third slice portion of the second plurality of control layers of the backhaul network to support massive machine type communications (mMTC).

5. The system of claim 4, wherein SDR based massive-MIMO is used to support high bandwidth requirements caused by selection of the first slice portion to support eMBB.

6. The system of claim 1, wherein the application or service being used by the at least one user device is implemented on a cloud based data center.

7. The system of claim 1, wherein the first slice portion of the of the first plurality of control layers of the radio access network and the first slice portion of the second plurality of control layers of the backhaul network implements a new service in the dynamically configurable network.

8. The system of claim 1, wherein the at least one server implements the at least the first and second slice portion of the radio access network and the backhaul network using software defined network (SDN) and network function virtualization (NFV) to define the configurable network infrastructure.

9. The system of claim 1, wherein the radio access network further comprises massive MIMO transceivers for establishing communications links with the backhaul network.

10. The system of claim 1, wherein the first slice portion and the second slice portion comprise differing amounts of the first plurality of control layers of the radio access network and the second plurality of control layers of the backhaul network depending on needs of the service or application associated with each of the first slice portion and the second slice portion.

11. A method for providing a dynamically configurable network between a core network and at least one user device responsive to an application or service being used by the at least one user device, comprising:
   providing a first communications link with the at least one user device through a radio access network including a first plurality of control layers;
   connecting the radio access network to a core network through a backhaul network including a second plurality of control layers;
   implementing at least a portion of the radio access network and the backhaul network within at least one server;
   selecting within the at least one server a first slice portion of the first plurality of control layers of the radio access network and a first slice portion of the second plurality of control layers of the backhaul network to support operation of a first application or service;
   providing the first application or service to the at least one user device on the first slice portion;
   selecting within the at least one server a second slice portion of the first plurality of control layers of the radio access network and a second slice portion of the second plurality of control layers of the backhaul network to support operation of a second application or service; and providing the second application or service to the at least one user device on the second slice portion.

12. The method of claim 11 further comprising the step of configuring the first server to implement a data center (DC) based cloud architecture.

13. The method of claim 12, wherein the steps of selecting further comprises:
selecting within the at least one server a first slice portion of the DC based cloud architecture to support operation of the first application or service; and
selecting within the at least one server a second slice portion of the DC based cloud architecture to support operation of the second application or service.

14. The system of claim 11, wherein the steps of selecting further comprise:
selecting at the at least one server the first slice portion of the first plurality of control layers of the radio access network and the first slice portion of the second plurality of control layers of the backhaul network to support enhanced mobile broadband (eMBB);
selecting at the at least one server the second slice portion of the first plurality of control layers of the radio access network and the second slice portion of the second plurality of control layers of the backhaul network to support ultra-reliable low latency communication (uRLLC); and
selecting at the at least one server a third slice portion of the first plurality of control layers of the radio access network and the third slice portion of the second plurality of control layers of the backhaul network to support massive machine type communications (mMTC).

15. The method of claim 14, wherein the step of selecting the first slice portion further comprises:
selecting of the first slice portion to support eMBB; and
implementing SDR based massive-MIMO to support high bandwidth requirements.

16. The method of claim 11 further comprises the step of implementing the application or service being used by the at least one user device on a cloud based data center.

17. The method of claim 11, wherein the first slice portion of the of the first plurality of control layers of the radio access network and the first slice portion of the second plurality of control layers of the backhaul network implements a new service in the dynamically configurable network.

18. The method of claim 11 further comprises implementing on the at least one server the at least the first and the second slice portion of the radio access network and the backhaul network using software defined network (SDN) and network function virtualization (NFV) to define the configurable network infrastructure.

19. The method of claim 11 further comprises establishing a communications link with the backhaul network using massive MIMO transceivers within the radio access network.

20. The method of claim 11, wherein the first slice portion and the second slice portion comprise differing amounts of the first plurality of control layers of the radio access network and the second plurality of control layers of the backhaul network depending on needs of the service or application associated with each of the first slice portion and the second slice portion.

21. A system for providing a connection between a core network and at least one user device responsive to an application or service being used by the at least one user device, comprising:
a dynamically configurable network including a plurality of control layers for connecting the core network and the at least one user device;
at least one server for implementing the dynamically configurable network; and
wherein the at least one server is configured to select a first slice portion of the plurality of control layers of the dynamically configurable network to support operation of a first application or service and to select a second slice portion of the plurality of control layers of the configurable network to support operation of a second application or service.

22. The system of claim 21, wherein the at least one server is further configured to implement a data center (DC) based cloud architecture.

23. The system of claim 22, wherein the at least one server is further configured to select a first slice portion of the DC based cloud architecture to support operation of the first application or service and to select a second slice portion of the DC based cloud architecture to support operation of the second application or service.

24. The system of claim 21, wherein the at least one server is further configured to select the first slice portion of the plurality of control layers of the configurable network to support enhanced mobile broadband (eMBB), to select the second slice portion of the plurality of control layers of the configurable network to support ultra-reliable low latency communication (uRLLC) and to select a third slice portion of the plurality of control layers of the configurable network to support massive machine type communications (mMTC).

25. The system of claim 24, wherein SDR based massive-MIMO is used to support high bandwidth requirements caused by selection of the first slice portion to support eMBB.

26. The system of claim 21, wherein the application or service being used by the at least one user device is implemented on a cloud based data center.

27. The system of claim 21, wherein the first slice portion of the plurality of control layers of the configurable network implements a new service in the dynamically configurable network.

28. The system of claim 21, wherein the at least one server implements the at least the first and the second slice portion of the configurable network using software defined network (SDN) and network function virtualization (NFV) to define the configurable network infrastructure.

29. The system of claim 21, wherein the configurable network further comprises massive MIMO transceivers for establishing communications links with the backhaul network.

30. The system of claim 21, wherein the first slice portion and the second slice portion comprise differing amounts of the plurality of control layers of the configurable network depending on needs of the service or application associated with each of the first slice portion and the second slice portion.

* * * * *